(12) United States Patent
Wang et al.

(10) Patent No.: US 10,999,129 B2
(45) Date of Patent: May 4, 2021

(54) FAULT DETECTION METHOD, APPARATUS, AND SYSTEM IN NFV SYSTEM

(71) Applicant: HUAWEI TECHNOLOGIES CO., LTD., Shenzhen (CN)

(72) Inventors: Shuaibing Wang, Shenzhen (CN); Jiyu Pan, Beijing (CN); Naiqiang Qiao, Nanjing (CN); Xia Zhu, Nanjing (CN); Jian Cheng, Nanjing (CN); Zuqing Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 16/429,059

(22) Filed: Jun. 2, 2019

(65) Prior Publication Data
US 2019/0288905 A1 Sep. 19, 2019

Related U.S. Application Data

(63) Continuation of application No. PCT/CN2017/109756, filed on Nov. 7, 2017.

(30) Foreign Application Priority Data

Dec. 2, 2016 (CN) .......................... 201611099758.0

(51) Int. Cl.
*H04L 12/24* (2006.01)
*H04L 12/26* (2006.01)

(52) U.S. Cl.
CPC ...... *H04L 41/0677* (2013.01); *H04L 41/0618* (2013.01); *H04L 41/0631* (2013.01);
(Continued)

(58) Field of Classification Search
CPC ............. H04L 41/0677; H04L 41/0631; H04L 41/0618; H04L 43/028; H04L 43/10; H04L 43/12
See application file for complete search history.

(56) References Cited

U.S. PATENT DOCUMENTS 8,693,981 B1 4/2014 Anugu
10,644,952 B2 * 5/2020 Xue .................... H04L 41/0668
(Continued)

FOREIGN PATENT DOCUMENTS

CN 1474542 A 2/2004
CN 1863173 A 11/2006
(Continued)

OTHER PUBLICATIONS

"Network Functions Virtualisation (NFV); Assurance; Report on Active Monitoring and Failure Detection", Group Specification, European Telecommunications Standards Institute (ETSI), vol. NFV REL, No. v1.1.1, Apr. 1, 2016, XP014274012, 61 pages.
(Continued)

*Primary Examiner* — Min Jung
(74) *Attorney, Agent, or Firm* — Kilpatrick Townsend & Stockton LLP

(57) ABSTRACT

In the method, a detection agent apparatus receives location information of a monitoring point on a service path that is sent by a detection control apparatus, where the detection agent apparatus is located in the NFV system; the detection agent apparatus obtains fault locating information from the monitoring point based on the location information of the monitoring point, where the fault locating information is information obtained by the monitoring point according to a filter criterion, and the fault locating information includes the location information of the monitoring point; and the detection agent apparatus sends the fault locating information to the detection control apparatus, where the detection control apparatus may determine a faulty monitoring point based on the fault locating information and a service model corresponding to the service path.

26 Claims, 11 Drawing Sheets

(52) U.S. Cl.
CPC ............ *H04L 43/028* (2013.01); *H04L 43/10*
(2013.01); *H04L 43/12* (2013.01); *H04L*
*41/046* (2013.01)

(56) References Cited

U.S. PATENT DOCUMENTS

| | | | |
|---|---|---|---|
| 2015/0142940 A1 | 5/2015 | McMurry et al. | |
| 2017/0093749 A1 | 3/2017 | Hoffmann | |
| 2017/0104608 A1* | 4/2017 | Sergeev | H04L 12/4641 |
| 2017/0250870 A1 | 8/2017 | Zhao | |
| 2017/0302505 A1* | 10/2017 | Zafer | H04L 69/40 |
| 2017/0324627 A1* | 11/2017 | Eardley | H04L 41/0893 |
| 2018/0139114 A1* | 5/2018 | Jiang | H04L 43/067 |

FOREIGN PATENT DOCUMENTS

| | | |
|---|---|---|
| CN | 101201788 A | 6/2008 |
| CN | 105049293 A | 11/2015 |
| CN | 105760214 A | 7/2016 |
| CN | 106452925 A | 2/2017 |
| CN | 106489260 A | 3/2017 |
| EP | 3280099 A1 | 2/2018 |
| WO | 2015106822 A1 | 7/2015 |
| WO | 2016082143 A1 | 6/2016 |
| WO | 2016157864 A1 | 10/2016 |

OTHER PUBLICATIONS

Eardley A. Morton ATandT Labs M Bagnulo UC3M Tburbridge P Aitken Brocade A Akhter Consultant P:"A Framework for Large-Scale Measurement of BroadbandPerformance (LMAP); rfc7594. txt",Sep. 18, 2015 (Sep. 18, 2015),pp. 1-55, XP015107686.
Bagnulo UC3M T Burbridge S Crawford Sam Knows Peardley A Morton ATandT Labs M: "A Reference Path andMeasurement Points for Large-Scale Measurement of BroadbandPerformance; rfc7398.txt",Feb. 18, 2015 (Feb. 18, 2015), pp. 1-17, XP015104548.

\* cited by examiner

FAULT DETECTION METHOD, APPARATUS, AND SYSTEM IN NFV SYSTEM

CROSS-REFERENCE TO RELATED APPLICATIONS

This application is a continuation of International Application No. PCT/CN2017/109756, filed on Nov. 7, 2017, which claims priority to Chinese Patent Application No. 201611099758.0, filed on Dec. 2, 2016. The disclosures of the aforementioned applications are hereby incorporated by reference in their entireties.

TECHNICAL FIELD

This application relates to the communications field, and in particular, to a fault detection method, apparatus, and system in a network functions virtualization (NFV) system.

BACKGROUND

NFV is a technical standard that uses a virtualization technology to carry network software functions by using devices such as a general large-capacity server and memory. NFV mainly uses a general server hardware platform to run virtualization software on a server and create a virtual machine. A network function of a common network element may run on the virtual machine in a form of software, to form a virtualized network function (VNF). In this way, NFV can screen out a difference between hardware platforms, and hardware resources can be shared to the greatest extent.

However, NFV needs to integrate a plurality of components by layers. For example, a plurality of components are integrated, such as a physical server, a host operating system (Host OS), a hypervisor, a virtual switch (vSwitch), a guest operating system (guest OS), a VNF, and NFV management and orchestration (MANO). A main function of NFV may be implemented through packet forwarding and service processing. However, when a packet is transmitted by using the host OS, the hypervisor, the vSwitch, the guest OS, and the VNF, a packet loss may be caused by a fault. Therefore, rapid and effective fault locating needs to be performed for an NFV system.

SUMMARY

Embodiments of this application provide a fault detection method in an NFV system, an apparatus, and a system, helping effectively locate a fault in the NFV and improve fault locating efficiency.

According to a first aspect, a fault detection method in an NFV system is provided. The method includes: receiving, by a detection agent apparatus, location information of a monitoring point on a service path that is sent by a detection control apparatus, where the detection agent apparatus is located in the NFV system; obtaining, by the detection agent apparatus, fault locating information from the monitoring point based on the location information of the monitoring point, where the fault locating information is information obtained by the monitoring point according to a filter criterion, and the fault locating information includes the location information of the monitoring point; and sending, by the detection agent apparatus, the fault locating information to the detection control apparatus.

In the foregoing method, the detection agent apparatus in the NFV system may obtain, based on the location information of the monitoring point on the service path that is sent by the detection control apparatus, fault locating information carried in a packet forwarded by the monitoring point. The detection agent apparatus may send the fault locating information to the detection control apparatus. This helps perform monitoring and fault locating between layers included in the NFV system or in each layer included in the NFV system, thereby avoiding fault locating by analyzing logs of the NFV system one by one, and improving fault locating efficiency.

Optionally, before the obtaining, by the detection agent apparatus, fault locating information from the monitoring point based on the location information of the monitoring point, the method further includes: receiving, by the detection agent apparatus, a detection packet and location information of an injection point on the service path that are sent by the detection control apparatus, where the detection packet is a to-be-captured packet based on which the monitoring point obtains the fault locating information; and sending, by the detection agent apparatus, the detection packet to the injection point.

The injection point is a node configured to inject the detection packet into the service path of the NFV system. Optionally, the injection point may be selected from a plurality of monitoring points included in the service path.

In the foregoing method, the detection agent apparatus may obtain a detection packet for a service from the detection control apparatus, and send the detection packet for the service to the injection point, thereby injecting the detection packet into a service path corresponding to the service. In a process of forwarding the detection packet along the service path, information carried in the detection packet, for example, 5-tuple information in a packet header of the detection packet, may change based on a forwarding action. The information in the packet header of the detection packet that changes based on the forwarding action includes the fault locating information. The detection agent apparatus may obtain, by using the monitoring point, the fault locating information carried in the detection packet forwarded along the service path.

Optionally, before the obtaining, by the detection agent apparatus, fault locating information from the monitoring point based on the location information of the monitoring point, the method further includes: receiving, by the detection agent apparatus, characteristic information corresponding to the service path and location information of an injection point on the service path that are sent by the detection control apparatus; generating, by the detection agent apparatus, M detection packets based on the characteristic information corresponding to the service path, where M is an integer greater than or equal to 1, and any one of the M detection packets is a to-be-captured packet based on which the monitoring point obtains the fault locating information; and sending, by the detection agent apparatus, the M detection packets to the injection point.

The injection point is a node configured to inject the detection packet into the service path of the NFV system. Optionally, the injection point may be selected from a plurality of monitoring points included in the service path.

In the foregoing method, the detection agent apparatus may generate the M detection packets based on characteristic information used to generate a detection packet and sent by the detection control apparatus, namely, the characteristic information corresponding to the service path. When M is 1, the detection agent apparatus may send one detection packet to the injection point, and send the one detection packet to the injection point, thereby injecting the one detection packet by using the injection point, where the one detection packet is used to detect whether a fault exists in the service path deployed in the NFV system. When M is an integer greater than 1, the detection agent apparatus may obtain one detection packet based on the characteristic information, and make M−1 copies of the one detection packet, to obtain the M detection packets. Any one of the M detection packets may further carry a sequence number, where the sequence number is used to identify a sequence in which the detection packet carrying the sequence number is injected into the service path. The detection agent apparatus may send the M detection packets to the injection point based on the sequence numbers, thereby injecting the M detection packets into the service path by using the injection point. Because all characteristic information but the sequence numbers carried in the M detection packets is the same, even if the monitoring point misses one of the M detection packets, the monitoring point can still capture another detection packet in the M detection packets to obtain the fault locating information, helping improve a fault locating success rate.

Optionally, the fault locating information is information that is obtained after the monitoring point filters a service packet forwarded along the service path. The fault locating information may be information that is obtained after the monitoring point takes, according to the filter criterion, a snapshot of the service packet forwarded along the service path.

In the foregoing method, the detection agent apparatus may not inject the detection packet into the service path, but directly use the service packet forwarded along the service path, to perform monitoring and fault locating. The fault locating information obtained from the monitoring point by the detection agent apparatus comes from the service packet forwarded along the service path, helping avoid the detection agent apparatus or the detection control apparatus generating the detection packet.

Optionally, the location information of the monitoring point is: the monitoring point is located in a hardware layer, the monitoring point is located in an operating system layer, or the monitoring point is located in a virtualization layer of the NFV system. Optionally, the location information of the monitoring point may be: the monitoring point is located between the hardware layer and the operating system layer, or the monitoring point is located between the operating system layer and the virtualization layer.

In the foregoing method, the detection agent apparatus may obtain location information of one or more monitoring points from the detection control apparatus. Any monitoring point may be located between two adjacent layers of the NFV system, or in any layer of the NFV system. Distribution locations and a quantity of the one or more monitoring points may be set based on requirements such as fault locating precision.

Optionally, the detection agent apparatus is located in the hardware layer, the operating system layer, or the virtualization layer of the NFV system.

In the foregoing method, a detection agent apparatus in the hardware layer may locate a fault in the hardware layer. A detection agent apparatus in the virtualization layer or the operating system layer may detect and locate a fault in the hardware layer that is caused by a vSwitch. A detection agent apparatus in the virtualization layer or the operating system layer may detect and locate a fault in the virtualization layer, in the operating system layer, between the virtualization layer and the operating system layer, or between the virtualization layer and the hardware layer. The detection agent apparatus may be disposed as required. For example, one or more detection agent apparatuses are disposed in the NFV system, to perform comprehensive detection and fault locating for the hardware layer, the operating system layer, and the virtualization layer.

Optionally, the filter criterion may be set at the monitoring point in a static configuration manner, and the filter criterion is used for obtaining the fault locating information from a to-be-filtered packet.

Optionally, before the obtaining, by the detection agent apparatus, fault locating information from the monitoring point based on the location information of the monitoring point, the method further includes: receiving, by the detection agent apparatus, the filter criterion of the monitoring point that is sent by the detection control apparatus, where the filter criterion is used for obtaining the fault locating information from a to-be-filtered packet; and sending, by the detection agent apparatus, the filter criterion of the monitoring point to the monitoring point based on the location information of the monitoring point.

In the foregoing method, the filter criterion may include one or more filter rules. Any one of the one or more filter rules includes a length, an offset, and a value. The monitoring point may use a length, an offset, and a value that are included in a filter rule obtained by the monitoring point, to obtain, through filtering, a packet carrying the fault locating information from the service packet or the detection packet that is forwarded along the service path.

Optionally, the obtaining, by the detection agent apparatus, fault locating information from the monitoring point based on the location information of the monitoring point includes: periodically reading, by the detection agent apparatus, the fault locating information from the monitoring point.

Optionally, the obtaining, by the detection agent apparatus, fault locating information from the monitoring point based on the location information of the monitoring point includes: receiving, by the detection agent apparatus, the fault locating information periodically sent by the monitoring point.

According to a second aspect, a fault detection method in an NFV system is provided. The method includes: sending, by a detection control apparatus, location information of a monitoring point on a service path to a detection agent apparatus, where the detection agent apparatus is located in the NFV system; receiving, by the detection control apparatus, fault locating information sent by the detection agent apparatus, where the fault locating information is information obtained by the monitoring point according to a filter criterion, and the fault locating information includes the location information of the monitoring point; and determining, by the detection control apparatus, a faulty monitoring point in the NFV system based on the fault locating information and a service model corresponding to the service path.

In the foregoing method, the detection control apparatus sends the location information of the monitoring point on the service path to the detection agent apparatus, and obtains, by using the detection agent apparatus, the fault locating information carried in the packet on the service path and captured by the monitoring point. The detection control apparatus may use the fault locating information to determine the faulty monitoring point. Therefore, layer-by-layer analysis of debugging information, statistical information, and log information of the NFV system is not needed, helping shorten a fault locating time and improve fault locating efficiency. In addition, the detection control apparatus may dispose monitoring points corresponding to different service paths, helping improve flexibility and generality.

Optionally, before the receiving, by the detection control apparatus, fault locating information sent by the detection agent apparatus, the method further includes: obtaining, by the detection control apparatus, characteristic information corresponding to the service path and location information of an injection point on the service path based on the service model, where the characteristic information is information required for generating a detection packet by the detection agent apparatus, and the detection packet is a to-be-captured packet based on which the monitoring point obtains the fault locating information; and sending, by the detection control apparatus, the characteristic information and the location information of the injection point to the detection agent apparatus.

Optionally, before the receiving, by the detection control apparatus, fault locating information sent by the detection agent apparatus, the method further includes: obtaining, by the detection control apparatus, characteristic information corresponding to the service path and location information of an injection point on the service path based on the service model, where the characteristic information is information required for generating a detection packet; generating, by the detection control apparatus, the detection packet based on the characteristic information, where the detection packet is a to-be-captured packet based on which the monitoring point obtains the fault locating information; and sending, by the detection control apparatus, the detection packet and the location information of the injection point to the detection agent apparatus.

The injection point is a node configured to inject the detection packet into the service path of the NFV system. Optionally, the injection point may be selected from a plurality of monitoring points included in the service path.

In the foregoing method, the detection control apparatus may send the detection packet generated based on the characteristic information to the detection agent apparatus, to avoid the detection agent apparatus generating the detection packet. This helps reduce load of the detection agent apparatus.

Optionally, before the receiving, by the detection control apparatus, fault locating information sent by the detection agent apparatus, the method further includes: obtaining, by the detection control apparatus, the filter criterion of the monitoring point based on the service model, where the filter criterion is used for obtaining the fault locating information from a to-be-filtered packet; and sending, by the detection control apparatus, the filter criterion of the monitoring point to the detection agent apparatus.

Optionally, before the sending, by a detection control apparatus, location information of a monitoring point on a service path to a detection agent apparatus in the NFV system, the method further includes: determining, by the detection control apparatus, the first node, the last node, and L intermediate nodes of the service path based on a service, where L is an integer greater than or equal to 0; obtaining, by the detection control apparatus, location information of the first node, location information of the last node, location information of each of the L intermediate nodes, a filter criterion of the first node, a filter criterion of the last node, and a filter criterion of each of the L intermediate nodes based on the service path; and obtaining, by the detection control apparatus, the service model based on the location information of the first node, the location information of the last node, the location information of each of the L intermediate nodes, the filter criterion of the first node, the filter criterion of the last node, and the filter criterion of each of the L intermediate nodes. The first node is a node at a start location of the service path. The last node is a node at an end location of the service path, namely, the last node through which the service path passes.

Optionally, the determining, by the detection control apparatus, a faulty monitoring point in the NFV system based on the fault locating information and a service model corresponding to the service path includes: obtaining, by the detection control apparatus, reference values of N parameters based on the service model corresponding to the service path, where the N parameters are parameters carried in a packet forwarded along the service path, N is an integer greater than or equal to 1, and the reference values are pre-estimated values of the N parameters obtained when there is no fault source on the service path; obtaining, by the detection control apparatus, measured values of the N parameters from the fault locating information, where the measured values are actual values of the N parameters obtained from the packet forwarded along the service path; and comparing, by the detection control apparatus, the reference values of the N parameters with the measured values of the N parameters, to determine the faulty monitoring point, where the faulty monitoring point is a monitoring point corresponding to a parameter whose measured value is different from its reference value.

Optionally, before the receiving, by the detection control apparatus, fault locating information sent by the detection agent apparatus, the method further includes: triggering, by the detection control apparatus by using a Network Configuration Protocol (NETCONF) interface, the detection agent apparatus to obtain the fault locating information.

In the foregoing method, the detection control apparatus may also trigger, by using another type of interface, the detection agent apparatus to obtain the fault locating information. The another type of interface may be a Simple Network Management Protocol (SNMP) interface, a Simple Object Access Protocol (SOAP) interface, a Multi-Technology Operations System Interface (MTOSI), a Representational State Transfer (REST) interface, or a Representational State Transfer Configuration Protocol (RESTCONF) interface.

According to a third aspect, a detection agent apparatus is provided, where the detection agent apparatus is located in an NFV system. The detection agent apparatus includes: a first receiving module, an obtaining module, and a first sending module, where the obtaining module can communicate with the first receiving module and the first sending module; the first receiving module is configured to receive location information of a monitoring point on a service path that is sent by a detection control apparatus; the obtaining module is configured to obtain fault locating information from the monitoring point based on the location information of the monitoring point, where the fault locating information is information obtained by the monitoring point according to a filter criterion, and the fault locating information includes the location information of the monitoring point; and the first sending module is configured to send the fault locating information to the detection control apparatus.

Optionally, the detection agent apparatus further includes one or more modules configured to perform any possible implementation of the first aspect.

Optionally, the obtaining module includes a first submodule, and the first submodule is configured to periodically read the fault locating information from the monitoring point. Alternatively, the obtaining module includes a second submodule, and the second submodule is configured to receive the fault locating information periodically sent by the monitoring point.

According to a fourth aspect, a detection agent apparatus is provided, where the detection agent apparatus may be located in an NFV system. The detection agent apparatus includes a processor, a memory, and a communications interface, where the processor, the memory, and the communications interface are connected by using a communications bus; the memory is configured to store a program; and the processor performs the method according to any one of the first aspect or the possible implementations of the first aspect based on an executable instruction included in the program read from the memory.

According to a fifth aspect, a detection control apparatus is provided. The detection control apparatus includes: a first sending module, a receiving module, and a fault determining module, where the fault determining module can communicate with the first sending module and the receiving module; the first sending module is configured to send location information of a monitoring point on a service path to a detection agent apparatus, where the detection agent apparatus is located in an NFV system; the receiving module is configured to receive fault locating information sent by the detection agent apparatus, where the fault locating information is information obtained by the monitoring point according to a filter criterion, and the fault locating information includes the location information of the monitoring point; and the fault determining module is configured to determine a faulty monitoring point in the NFV system based on the fault locating information and a service model corresponding to the service path.

Optionally, the detection control apparatus further includes one or more modules configured to perform any possible implementation of the second aspect.

Optionally, the fault determining module includes a first obtaining submodule, a second obtaining submodule, and a comparison submodule, where the comparison submodule can communicate with the first obtaining submodule and the second obtaining submodule; the first obtaining submodule is configured to obtain reference values of N parameters based on the service model corresponding to the service path; the second obtaining submodule is configured to obtain measured values of the N parameters from the fault locating information; and the comparison submodule is configured to compare the reference values of the N parameters with the measured values of the N parameters, to determine the faulty monitoring point. For the reference values of the N parameters and the measured values of the N parameters, refer to corresponding content in the second aspect.

According to a sixth aspect, a detection control apparatus is provided. The detection control apparatus includes a processor, a memory, and a communications interface, where the processor, the memory, and the communications interface are connected by using a communications bus; the memory is configured to store a program; and the processor performs the method according to any one of the second aspect or the possible implementations of the second aspect based on an executable instruction included in the program read from the memory.

According to a seventh aspect, a fault detection system is provided, where the system includes the detection agent apparatus according to any one of the third aspect or the possible implementations of the third aspect and the detection control apparatus according to any one of the fourth aspect or the possible implementations of the fourth aspect; or the system includes the detection agent apparatus according to any one of the fifth aspect or the possible implementations of the fifth aspect and the detection control apparatus according to any one of the sixth aspect or the possible implementations of the sixth aspect.

DESCRIPTION OF EMBODIMENTS

An application scenario is described in the embodiments of this application to describe the technical solutions in the embodiments of this application more clearly, and does not constitute any limitation to the technical solutions provided in the embodiments of this application. A person of ordinary skill in the art may learn that with evolution of network architectures and appearance of new service scenarios, the technical solutions provided in the embodiments of this application are also applicable to a similar technical problem.

Figure 1:
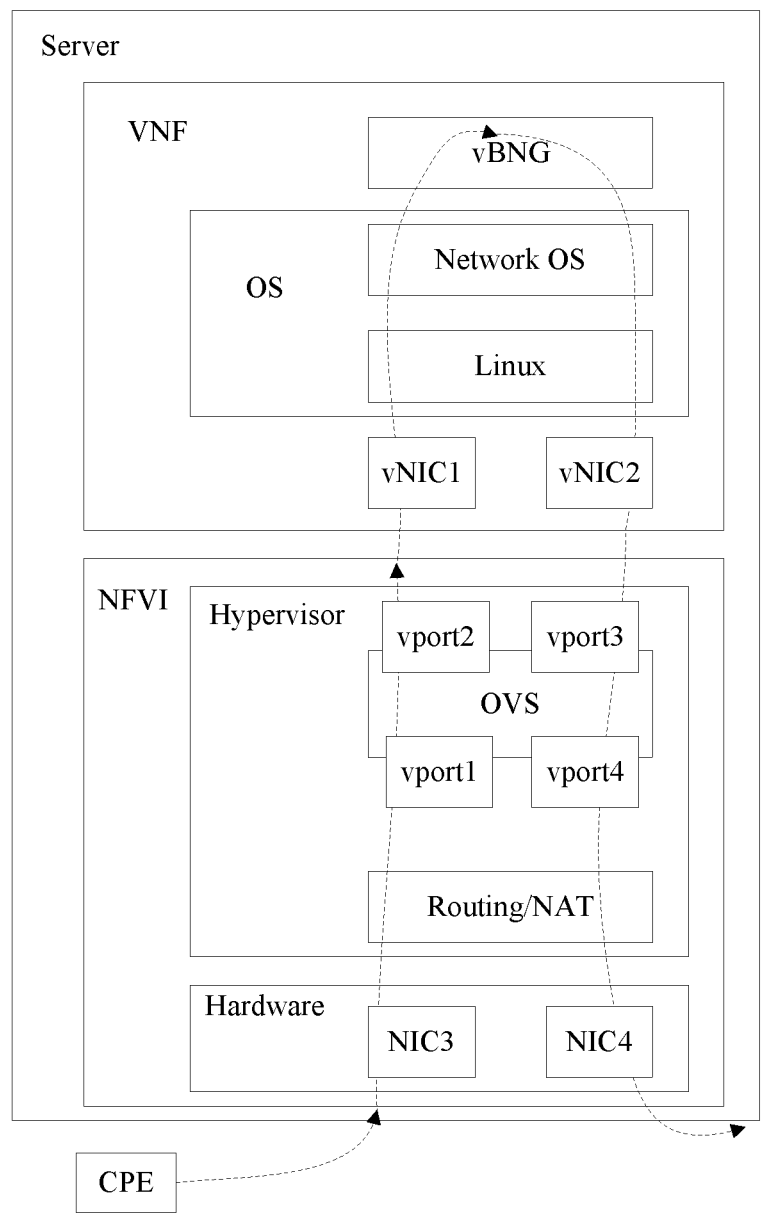
FIG. 1 is a schematic diagram of a possible application scenario.

In a scenario shown in FIG. 1, an NFV system is disposed on a server shown in FIG. 1. The NFV system includes a virtualized network function (VNF) and a network functions virtualization infrastructure (NFVI). The VNF includes a virtual broadband network gateway (vBNG), an operating system (OS), and x virtual network interface cards (vNIC), where x is an integer greater than or equal to 1. The x vNICs may include a vNIC 1 and a vNIC 2 in FIG. 1. The OS includes a network OS and a guest OS. The NFVI includes a hypervisor and a hardware layer. The hypervisor includes an open-source virtual switch (OVS) and a routing/network address translation (Routing/NAT) module. The OVS includes y virtual ports (vport), where y is an integer greater than or equal to 1. They vports may include a vport 1, a vport 2, a vport 3, and a vport 4 in FIG. 1. The hardware layer includes z network interface cards (NIC), where z is an integer greater than or equal to 1. The z NICs may include a NIC 3 and a NIC 4 in FIG. 1. The guest OS may be Linux. The routing/NAT module is configured to perform network address translation (NAT) and routing on a received packet.

The server receives a service packet sent by customer-premises equipment (CPE). The service packet enters the NFV system included in the server through the NIC 3 of the server. After being forwarded along a service path of the NFV system, the service packet is forwarded through the NIC 4 of the server to a network that can communicate with the server. The service path of the NFV system is a path shown by a dashed line in FIG. 1. The service path marked by the dashed line in FIG. 1 may be denoted as NIC 3→Routing/NAT→vport 1→vport 2→vNIC 1→Linux→Network OS→vBNG→Network OS→Linux→vNIC 2→vport 3→vport 4→Routing/NAT→NIC 4. If a node included in the service path becomes faulty. For example, an error filtering list is set for the vBNG The error filtering list includes a source Internet Protocol (IP) address that is not allowed to access to a network. If the source IP address that is not allowed to access to the network includes a source IP address of the service packet, the vBNG discards the service packet. If the error filtering list is set for the vBNG after the service packet is found to be lost, information such as debugging information and/or log information of the NFV system may be analyzed layer by layer, to determine that a fault source is at the vBNG In view of the foregoing problem, the embodiments of this application provide a method that can rapidly implement fault locating and simplify fault detection. According to the method, a detection agent apparatus obtains fault locating information from a monitoring point based on location information of the monitoring point that is sent by a detection control apparatus. The fault locating information may be information that is obtained, by the monitoring point according to a filter criterion, from a packet forwarded along the service path. The packet forwarded along the service path may be a detection packet that is injected by the detection agent apparatus, or may be a service packet from the CPE. The detection agent apparatus sends the fault locating information to the detection control apparatus. The detection control apparatus may determine a faulty monitoring point in the NFV system based on the fault locating information and a service model. According to the fault detection method in the NFV system provided in the embodiments of this application, fault locating can be implemented by capturing information carried in the packet on the service path, and there is no need to infer location information of a fault source by analyzing information such as debugging information and/or log information after a fault occurs, which improves flexibility, generality, and fault locating efficiency, and reduces fault detection difficulty.

Figure 2:
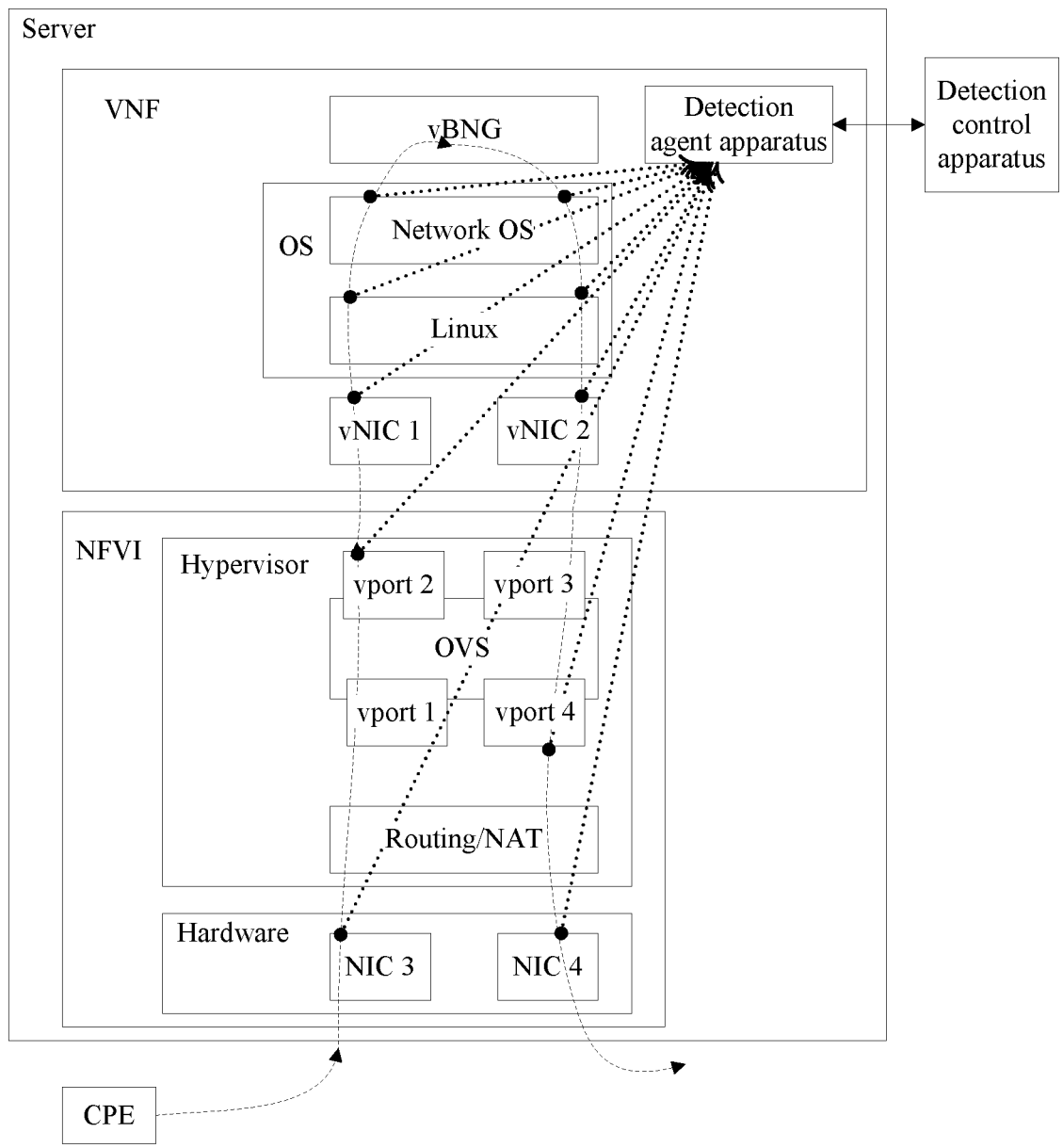
FIG. 2 is a schematic diagram of a scenario according to Embodiment 1 of this application.

A basic structure of a server shown in FIG. 2 is similar to that of the server shown in FIG. 1. In FIG. 2, a detection agent apparatus is located in the VNF, and a detection control apparatus may be a device independent of the server. The detection agent apparatus can communicate with one or more components in the VNF and an NFVI shown in FIG. 2. For example, the detection agent apparatus can communicate with a network OS, a guest OS, a vNIC 1, and a vNIC 2 in the VNF, and the detection agent apparatus can further communicate with a NIC 3 and a NIC 4 in the NFVI, and a vport 1 and a vport 4 included in an OVS. The detection agent apparatus can further communicate with another layer or another module included in the VNF and the NFVI. Examples are not described one by one herein. Hardware in FIG. 2 belongs to a hardware layer of the NFV system. A hypervisor, a vBNG and the vNIC 1 and the vNIC 2 included in the VNF in FIG. 2 belong to a virtualization layer of the NFV system. An OS in FIG. 2 belongs to an operating system layer of the NFV system.

Nodes through which a service path shown in FIG. 2 passes are the same as nodes through which the service path shown in FIG. 1 passes. The service path marked by a dashed line in FIG. 2 is NIC 3→Routing/NAT→vport 1→vport 2→vNIC 1→Linux→Network OS→vBNG→Network OS→Linux→vNIC 2→vport 3→vport 4→Routing/NAT→NIC 4. The service path in the embodiments of this application corresponds to a service. A first service packet and a second service packet that are used to implement a service pass a same service path in the NFV system. The first service packet is any service packet used to implement the service. The second service packet implements the same service as the first service packet. The second service packet is a service packet different from the first service packet.

Figure 3:
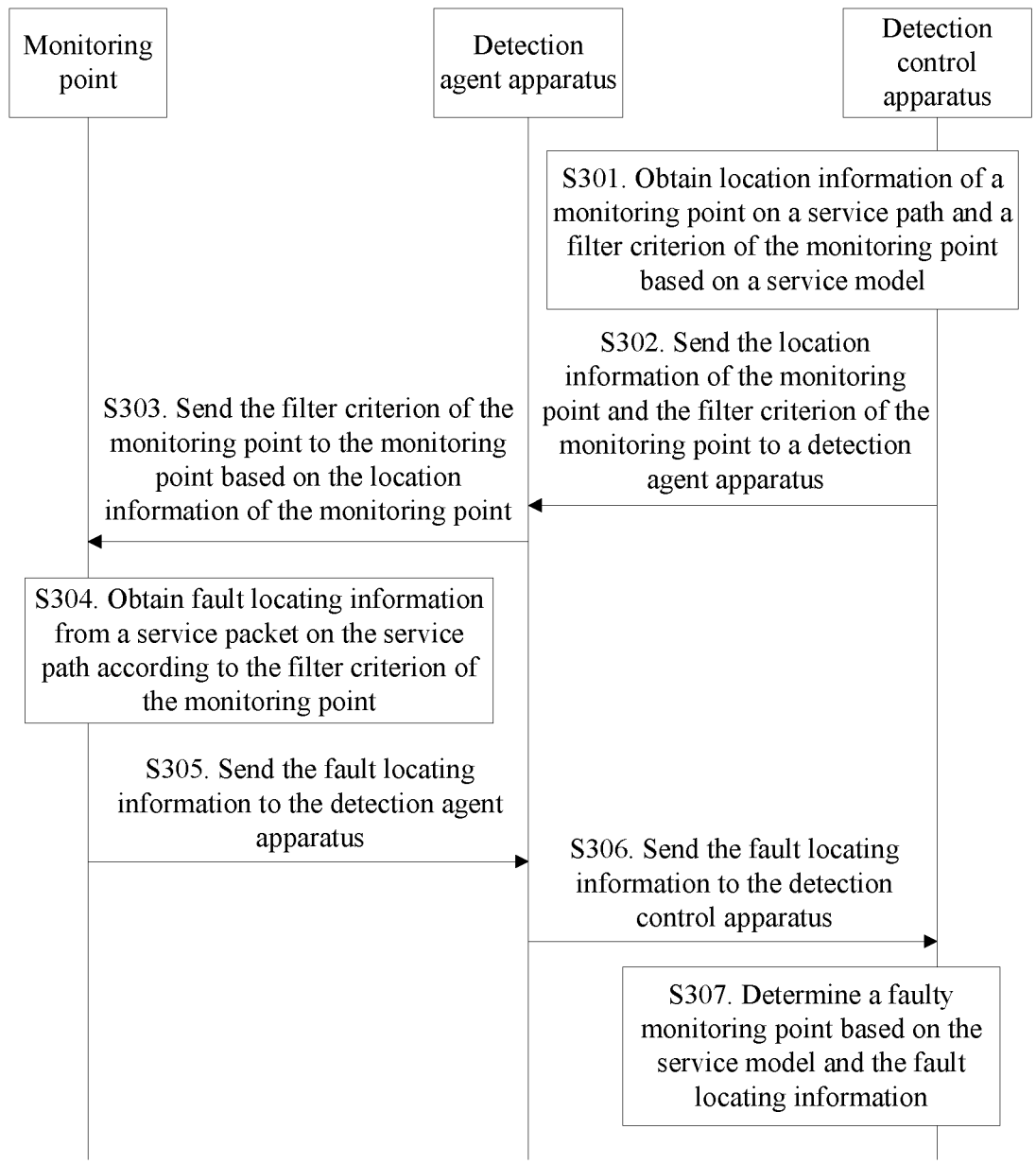
FIG. 3 is a flowchart of a fault detection method in an NFV system according to Embodiment 1 of this application.

FIG. 3 is a flowchart of a fault detection method in an NFV system according to Embodiment 1 of this application. A detection agent apparatus may be located in the virtualization layer, the operating system layer, or the hardware layer. The method provided in Embodiment 1 of this application is described by using an example in which the detection agent apparatus is located in the VNF and the detection control apparatus is independent of the server. The method shown in FIG. 3 is applicable to the NFV system shown in FIG. 2. The detection control apparatus can communicate with the detection agent apparatus by using a protocol such as SNMP, NETCONF, SOAP, MTOSI, REST, or RESTCONT. The method provided in Embodiment 1 of this application is an in-line monitoring method. The in-line monitoring method is a method for capturing the service packet forwarded along the service path shown in FIG. 2 to obtain the fault locating information. With reference to FIG. 2 and FIG. 3, the following describes the fault detection method in the NFV system provided in Embodiment 1 of this application.

S301. The detection control apparatus obtains location information of a monitoring point on a service path and a filter criterion of the monitoring point based on a service model.

Optionally, before S301, the method provided in this embodiment of this application further includes: generating, by the detection control apparatus, the service model. The generating, by the detection control apparatus, the service model includes: determining, by the detection control apparatus, the first node, the last node, and L intermediate nodes of the service path based on a service, where L is an integer greater than or equal to 0; obtaining, by the detection control apparatus, location information of the first node, location information of the last node, location information of each of the L intermediate nodes, a filter criterion of the first node, a filter criterion of the last node, and a filter criterion of each of the L intermediate nodes based on the service path; and obtaining, by the detection control apparatus, the service model based on the location information of the first node, the location information of the last node, the location information of each of the L intermediate nodes, the filter criterion of the first node, the filter criterion of the last node, and the filter criterion of each of the L intermediate nodes.

For example, the detection control apparatus obtains the location information of the monitoring point on the service path and the filter criterion of the monitoring point from a service model corresponding to a service that needs to be monitored. The service path corresponds to the service. The detection control apparatus may select all or some monitoring points from the service model. For example, a plurality of selected monitoring points in FIG. 2 are located at the NIC 3, the vport 2, the vNIC 1, the guest OS, the network OS, the vNIC 2, the vport 4, and the NIC 4, respectively. The service packet forwarded along the service path, for example, a service packet sent by the CPE to the server in FIG. 2, passes through the plurality of monitoring points successively in an order indicated by arrows in FIG. 2. The detection control apparatus may select IDs of the plurality of monitoring points from the service model. The IDs of the monitoring points may identify relative locations of the monitoring points on the service path. For example, an identifier of the NIC 3 is 1, an identifier of the vport 2 is 2, an identifier of the vNIC 1 is 3, an identifier of the guest OS is 4, an identifier of the network OS is 5, an identifier of the vNIC 2 is 6, an identifier of the vport 4 is 7, and an identifier of the NIC 4 is 8. Alternatively, an identifier of the NIC 3 is 10, an identifier of the vport 2 is 13, an identifier of the vNIC 1 is 14, an identifier of the guest OS is 15, an identifier of the network OS is 16, an identifier of the vNIC 2 is 18, an identifier of the vport 4 is 20, and an identifier of the NIC 4 is 22.

For example, the filter criterion provided in this embodiment of this application may include one or more rules. Any one rule in the one or more rules is used for obtaining a fault locating parameter. The fault locating information in this embodiment of this application includes the fault locating parameter. The any one rule includes offset, length, and value, and may be denoted as <offset, length, value>. A value of offset is used to represent a start location of a truncated field. A value of length is used to represent a length of the truncated field. Value is used to represent a to-be-compared value. The any one rule indicates that a field whose offset value is a start location and whose length is length is obtained from the first byte of a packet header, and if data carried in the truncated field is the value carried in value, it indicates that the packet carries the fault locating parameter. For example, the filter criterion may include one or more of <2, 2, 0x5601>, <3, 3, 0x604020>, and <0, 1, 0x34>. In the rule <2, 2, 0x5601>, values of offset and length are both 2, and a value of value is 0x5601. In the rule <3, 3, 0x604020>, values of offset and length are both 3, and a value of value is 0x604020. In the rule <0, 1, 0x34>, a value of offset is 0, a value of length is 1, and a value of value is 0x34.

Optionally, the any one rule may further include mask, and may be represented by <offset, length, value, mask>. For example, the filter criterion may include one or more of <2, 2, 0x5601, 0xff01>, <3, 3, 0x604020, 0xf0f0f0>, and <0, 1, 0x34, 0xff>. In the rule <2, 2, 0x5601, 0xff01>, a value of mask is 0xff01. In the rule <3, 3, 0x604020, 0xf0f0f0>, a value of mask is 0xf0f0f0. In the rule <0, 1, 0x34, 0xff5, a value of mask is 0xff.

S302. The detection control apparatus sends the location information of the monitoring point and the filter criterion of the monitoring point to the detection agent apparatus.

Optionally, the detection control apparatus may further send an identifier (ID) of a service to the detection agent apparatus when sending the location information of the monitoring point and the filter criterion of the monitoring point.

Optionally, the detection control apparatus may further trigger, by using a NETCONF interface, the detection agent apparatus to obtain the fault locating information when, before, or after sending the location information of the monitoring point and the filter criterion of the monitoring point to the detection agent apparatus.

S303. The detection agent apparatus sends the filter criterion of the monitoring point to the monitoring point based on the location information of the monitoring point.

For example, when receiving the location information of the monitoring point from detection control apparatus, the detection agent apparatus may start a procedure of obtaining the fault locating information. After obtaining the location information of the monitoring point and the filter criterion of the monitoring point, the detection agent apparatus may record the location information of the monitoring point. The detection agent apparatus may communicate with the monitoring point by using a communications protocol on which an operating system in the server is based. The communications protocol may be inter-process communication (IPC) or transparent inter-process communication (TIPC).

Optionally, after the detection agent apparatus obtains the ID of the service from the detection control apparatus, the detection agent apparatus may record the location information of the monitoring point and the ID of the service.

As shown in FIG. 2, the detection agent apparatus may send a filter criterion of the NIC 3 to the NIC 3, send a filter criterion of the vport 2 to the vport 2, send a filter criterion of the vNIC 1 to the vNIC 1, send a filter criterion of the guest OS to Linux, send a filter criterion of the network OS to the network OS, send a filter criterion of the vNIC 2 to the vNIC 2, send a filter criterion of the vport 4 to the vport 4, and send a filter criterion of the NIC 4 to the NIC 4.

For example, if the packet forwarded along the service path is a User Datagram Protocol (UDP) packet, a same filter criterion may be configured on the vNIC 1 and the network OS that are used as monitoring points, and the filter criterion may be denoted as follows:

```
<snifferRule>
    <ruleNo>1</ruleNo>
    <conditions>
        <condition>
            <offset>26</offset>
            <!-- source IP address 10.136.157.67 -->
            <value>0x0a889d43</value>
            <length>4</length>
        </condition>
        <condition>
            <offset>30</offset>
            <!-- destination IP address 10.136.157.66 -->
            <value>0x0a889d42</value>
            <length>4</length>
        </condition>
        <condition>
            <offset>23</offset>
            <!-- protocol number -->
            <value>0x11</value>
            <length>1</length>
        </condition>
        <condition>
            <offset>34</offset>
            <!-- source port number -->
            <value>0xe518</value>
            <length>2</length>
        </condition>
        <condition>
            <offset>36</offset>
            <!-- destination port number -->
            <value>0xbac1</value>
            <length>2</length>
        </condition>
    </conditions>
</snifferRule>
```

In the foregoing filter criterion configured on the vNIC 1 and the network OS, snifferRule represents the filter criterion of the monitoring point, and a condition represents any rule. A rule 1 is used as an example. The rule includes five rules, namely, five conditions. The five rules include a first rule, a second rule, a third rule, a fourth rule, and a fifth rule. The first rule is related to a source IP address. The first rule indicates that a field whose offset is 26 and whose length is 4 carries a source IP address, and the source IP address is 0x0a889d43. An IP address represented by 0x0a889d43 is 10.136.157.67. The second rule is related to a destination IP address. The second rule indicates that a field whose offset is 30 and whose length is 4 carries a destination IP address, and the destination IP address is 0x0a889d42. An IP address represented by 0x0a889d42 is 10.136.157.66. The third rule is related to a protocol number. The third rule indicates that a field whose offset is 23 and whose length is 1 carries a protocol number, and the protocol number is 0x11. 0x11 indicates that the packet is a UDP packet. The fourth rule is related to a source port number. The fourth rule indicates that a field whose offset is 34 and whose length is 2 carries a source port number, and the source port number is 0xe518. The fifth rule is related to a destination port number. The fifth rule indicates that a field whose offset is 36 and whose length is 2 carries a destination port number, and the destination port number is 0xbac1.

For example, if the UDP packet enters a Virtual Extensible LAN (VXLAN) tunnel after being forwarded by the vBNG, that is, IPv4 encapsulation is added to an outer layer of the UDP packet that has been forwarded by the vBNG, a filter criterion configured on the vNIC 2 used as a monitoring point may be denoted as follows:

```
<snifferRule>
    <ruleNo>1</ruleNo>
    <conditions>
        <condition>
            <offset>76</offset>
            <!-- source IP address 10.136.157.67 -->
            <value>0x0a889d43</value>
            <length>4</length>
        </condition>
        <condition>
            <offset>80</offset>
            <!-- destination IP address 10.136.157.66 -->
            <value>0x0a889d42</value>
            <length>4</length>
        </condition>
        <condition>
            <offset>73</offset>
            <!-- protocol number -->
            <value>0x11</value>
            <length>1</length>
        </condition>
        <condition>
            <offset>84</offset>
            <!-- source port number -->
            <value>0xe518</value>
            <length>2</length>
        </condition>
        <condition>
            <offset>86</offset>
            <!-- destination port number -->
            <value>0xbac1</value>
            <length>2</length>
        </condition>
    </conditions>
</snifferRule>
```

In the foregoing filter criterion configured on the vNIC 2, snifferRule represents the filter criterion of the monitoring point, and a condition represents any rule. A rule 1 is used as an example. The rule includes five rules, namely, five conditions. The five rules include a sixth rule, a seventh rule, an eighth rule, a ninth rule, and a tenth rule. The sixth rule is related to a source IP address. The sixth rule indicates that a field whose offset is 76 and whose length is 4 carries a source IP address, and the source IP address is 0x0a889d43. An IP address represented by 0x0a889d43 is 10.136.157.67. The seventh rule is related to a destination IP address. The seventh rule indicates that a field whose offset is 80 and whose length is 4 carries a destination IP address, and the destination IP address is 0x0a889d42. An IP address represented by 0x0a889d42 is 10.136.157.66. The eighth rule is related to a protocol number. The eighth rule indicates that a field whose offset is 73 and whose length is 1 carries a protocol number, and the protocol number is 0x11. 0x11 indicates that the packet is a UDP packet. The ninth rule is related to a source port number. The ninth rule indicates that a field whose offset is 84 and whose length is 2 carries a source port number, and the source port number is 0xe518. The tenth rule is related to a destination port number. The tenth rule indicates that a field whose offset is 86 and whose length is 2 carries a destination port number, and the destination port number is 0xbac1. A packet received by the vNIC 2 is a UDP packet with IPv4 encapsulated in an outer layer. Location information of 5-tuple information (a source IP address, a destination IP address, a protocol number, a source port, and a destination port) in a packet header changes. To accurately obtain the 5-tuple information in the packet header, the value of offset in the filter criterion configured on the vNIC 2 needs to be adjusted correspondingly.

Optionally, after being triggered, by using the NETCONF interface, to obtain the fault locating information, the detection agent apparatus may send the filter criterion of the monitoring point to the monitoring point. In another implementation provided in this embodiment of this application, the detection agent apparatus may be triggered to obtain the fault locating information after sending the filter criterion of the monitoring point to the monitoring point. After being triggered to obtain the fault locating information, the detection agent apparatus may trigger the monitoring point to capture the service packet.

S304. The monitoring point obtains fault locating information from a service packet on the service path according to the filter criterion of the monitoring point.

For example, the monitoring point may periodically obtain the fault locating information. Alternatively, the monitoring point may obtain the fault locating information based on an indication from the detection agent apparatus. The indication from the detection agent apparatus may be that the detection agent apparatus delivers a piece of information used to indicate a detection time point or an instruction used to indicate that detection starts. Possible manners are not described one by one herein.

For example, the monitoring point is the vNIC 1. The vNIC 1 detects a received service packet according to the five rules configured in S303. If the vNIC 1 determines, according to the five rules, that a source IP address included in the received service packet is 0x0a889d43, that a destination IP address is 0x0a889d42, that a protocol number is 0x11, that a source port number is 0xe518, and that a destination port number is 0xbac1, the vNIC 1 takes a snapshot of a packet header of the received service packet, to obtain a snapshot including the fault locating information. If the vNIC 1 determines, according to the five rules, that at least one parameter of 5-tuple information included in the received service packet is different from a value in the rules, the vNIC 1 gives up taking a snapshot of a packet header of the received service packet. Methods for obtaining, by the network OS and the vNIC 2 as monitoring points, a snapshot including the fault locating information are the same as the method for obtaining, by the vNIC 1, the snapshot including the fault locating information. Details are not described herein.

For example, if the packet forwarded along the service path is a Border Gateway Protocol (BGP) packet encapsulated by using the Transmission Control Protocol (TCP), the monitoring point may capture 5-tuple information in the BGP packet. The 5-tuple information includes a source IP address, a destination IP address, a protocol number, a source port number, and a destination port number of the BGP packet. If the packet forwarded along the service path is an Open Shortest Path First (OSPF) protocol packet encapsulated by using the Internet Protocol (IP), the monitoring point may capture 3-tuple information in the OSPF protocol packet. The 3-tuple information includes a source IP address, a destination IP address, and a protocol number of the OSPF protocol packet. If the packet forwarded along the service path is a Multiple Spanning Tree Protocol (MSTP) packet encapsulated through Layer 2 encapsulation, the monitoring point may capture a destination Media Access Control (MAC) address and a frame type in the MSTP packet.

Optionally, the fault locating information obtained by the monitoring point may be information that is obtained after the monitoring point takes, according to the filter criterion, a snapshot of the packet forwarded along the service path.

S305. The monitoring point sends the fault locating information to the detection agent apparatus.

For example, when the monitoring point periodically captures the service packet, the monitoring point may periodically send the fault locating information to the detection agent apparatus. The monitoring point may further add a sequence number to the fault locating information, and send the fault locating information to the detection agent apparatus. The sequence number carried in the fault locating information is used to identify a sequence in which the monitoring point obtains the fault locating information. When the monitoring point is triggered by the detection agent apparatus to capture the service packet, the monitoring point may obtain the fault locating information, and send the fault locating information to the detection agent apparatus.

Optionally, after the monitoring point sends the fault locating information to the detection agent apparatus, the monitoring point may stop detecting the service packet based on an instruction that is used to disable detection and that is sent by the detection agent apparatus.

S306. The detection agent apparatus sends the fault locating information to the detection control apparatus.

For example, the detection agent apparatus may obtain the fault locating information from the monitoring point based on the location information of the monitoring point recorded in S303, and send the location information of the monitoring point and the fault locating information to the detection control apparatus, so that the detection control apparatus can learn a service model corresponding to the fault locating information based on the location information of the monitoring point.

Optionally, the detection agent apparatus records the ID of the service in S303. The detection agent apparatus may send the ID of the service and the fault locating information to the detection control apparatus, so that the detection control apparatus can learn a service model corresponding to the fault locating information based on the ID of the service.

If the fault locating information includes a parameter that can uniquely identify a service model, the detection agent apparatus may send only the fault locating information to the detection control apparatus, so that the detection control apparatus can obtain a corresponding service model based on the fault locating information. The fault locating information may include the parameter that can uniquely identify the service model.

Optionally, in another implementation provided in this embodiment of this application, the detection control apparatus may determine the service model based on the service path. The detection control apparatus may determine, based on the location information of the monitoring point, a service path on which the monitoring point is located. The detection control apparatus may determine, based on the ID of the service, a service path corresponding to the service.

S307. The detection control apparatus determines a faulty monitoring point based on the service model and the fault locating information.

The detection control apparatus may search for, based on one or more of the fault locating information, the ID of the service, and the location information of the monitoring point that are sent by the detection agent apparatus in S306, at least one service model generated by the detection control apparatus, to obtain the service model corresponding to the service path.

For example, that the detection control apparatus determines a faulty monitoring point based on the service model and the fault locating information includes: obtaining, by the detection control apparatus, reference values of N parameters based on the service model corresponding to the service path, where the N parameters are parameters carried in a packet forwarded along the service path, N is an integer greater than or equal to 1, and the reference values are pre-estimated values of the N parameters obtained when there is no fault source on the service path; obtaining, by the detection control apparatus, measured values of the N parameters from the fault locating information, where the measured values are actual values of the N parameters obtained from the packet forwarded along the service path; and comparing, by the detection control apparatus, the reference values of the N parameters with the measured values of the N parameters, to determine the faulty monitoring point, where the faulty monitoring point is a monitoring point corresponding to a parameter whose measured value is different from its reference value. The pre-estimated value may be considered as a value measured in a normal state.

Optionally, the filter criterion of the monitoring point may be set at the monitoring point in a static configuration manner. In this way, in the method provided in Embodiment 1 of this application, the detection control apparatus may send the location information of the monitoring point to the detection agent apparatus, without sending the filter criterion of the monitoring point in S302. The detection agent apparatus may not perform S303.

The packet forwarded along the service path in Embodiment 1 of this application is a service packet from the CPE. Optionally, the packet forwarded along the service path may also be a detection packet generated by the detection agent apparatus or the detection control apparatus.

In the fault detection method in the NFV system provided in Embodiment 1 of this application, the detection control apparatus sends the location information of the monitoring point to the detection agent apparatus. The monitoring point captures, according to the filter criterion obtained from the detection agent apparatus or the filter criterion preset at the monitoring point, the information carried in the service packet on the service path, to obtain the fault locating information. The detection agent apparatus sends, to the detection control apparatus, the fault locating information sent by the monitoring point, so that the detection control apparatus can analyze and determine a faulty monitoring point, thereby avoiding fault locating by analyzing logs of the NFV system one by one, and improving fault locating efficiency. In the method provided in Embodiment 1 of this application, the detection control apparatus may set a corresponding monitoring point for a service path corresponding to each service, to improve fault locating flexibility. The detection control apparatus may perform fault detection in a process in which the NFV system processes a service packet, helping improve realtimeness of fault locating.

Figure 4:
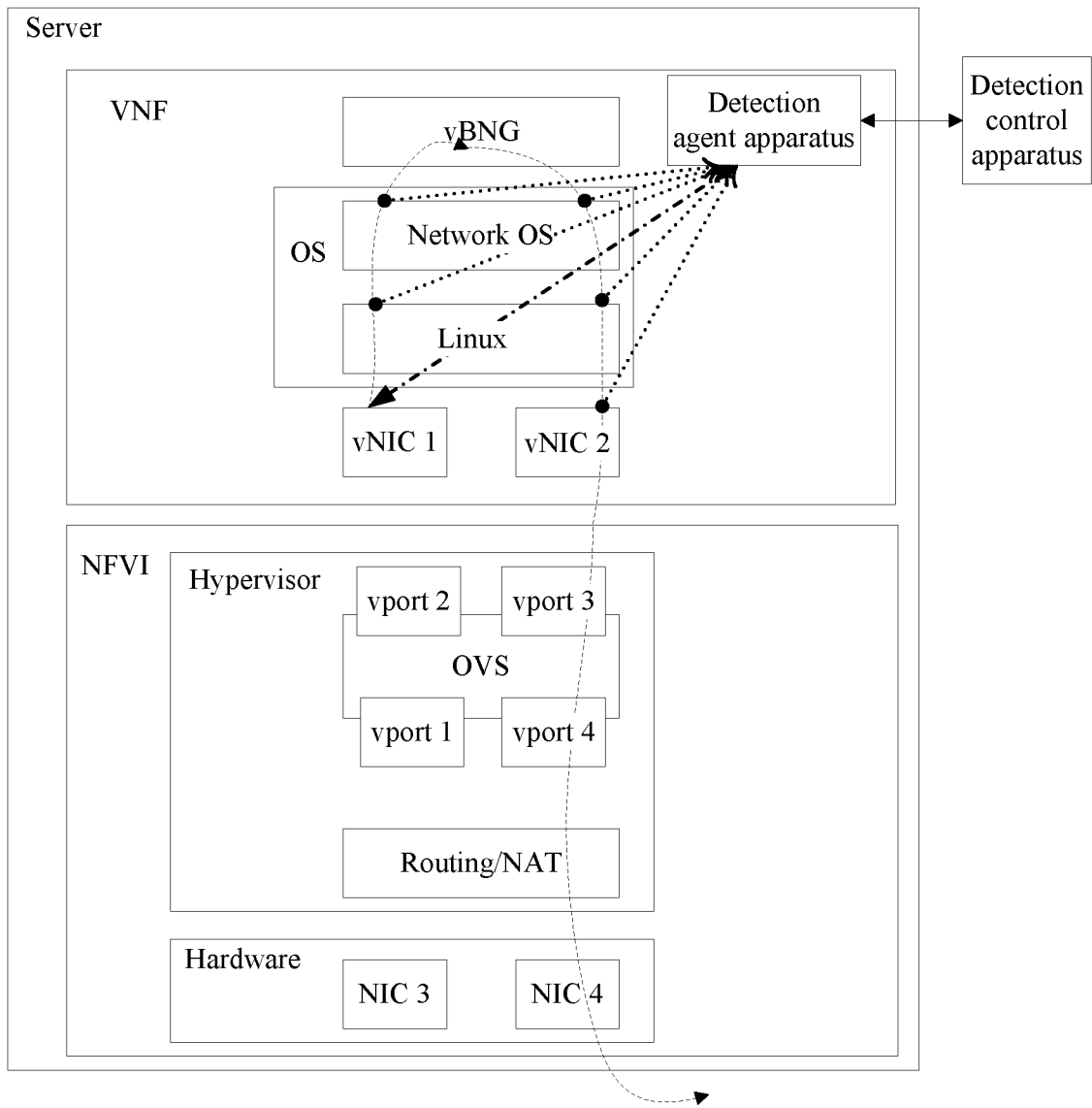
FIG. 4 is a schematic diagram of a scenario according to Embodiment 2 of this application.

A server shown in FIG. 4 has the same structure as the server shown in FIG. 2. An NFV system on the server shown in FIG. 4 can also implement a function of the NFV system on the server shown in FIG. 2. In other words, a service path along which a service packet passes on the server shown in FIG. 4 is the same as a service path along which the service packet passes on the server shown in FIG. 2. A service path shown by a dashed line in FIG. 4 is a part of the service path shown in FIG. 2. The service path marked by the dashed line in FIG. 4 is vNIC 1→Linux→Network OS→vBNG→Network OS→Linux→vNIC 2→vport 3→vport 4→Routing/NAT→NIC 4. In a scenario provided in Embodiment 2 of this application, a detection control apparatus needs to detect and locate a fault in a VNF, and monitoring points determined by the detection control apparatus are distributed in the VNF. An injection point selected by the detection control apparatus is a vNIC 1. The detection control apparatus may also select a node on another service path as the injection point. Details are not described by using an example herein again. The detection agent apparatus injects M detection packets into the vNIC 1, and any one of the detection packets may be a generic operation, administration, and maintenance (GOAM) packet, where M is an integer greater than or equal to 1. The M detection packets injected into the VNF may be forwarded along the service path shown by the dashed line in FIG. 4. A structure that is the same as that in Embodiment 1 is not described in Embodiment 2 of this application again. The method in Embodiment 2 may be implemented based on the NFV system in FIG. 2 or FIG. 4.

Figure 5:
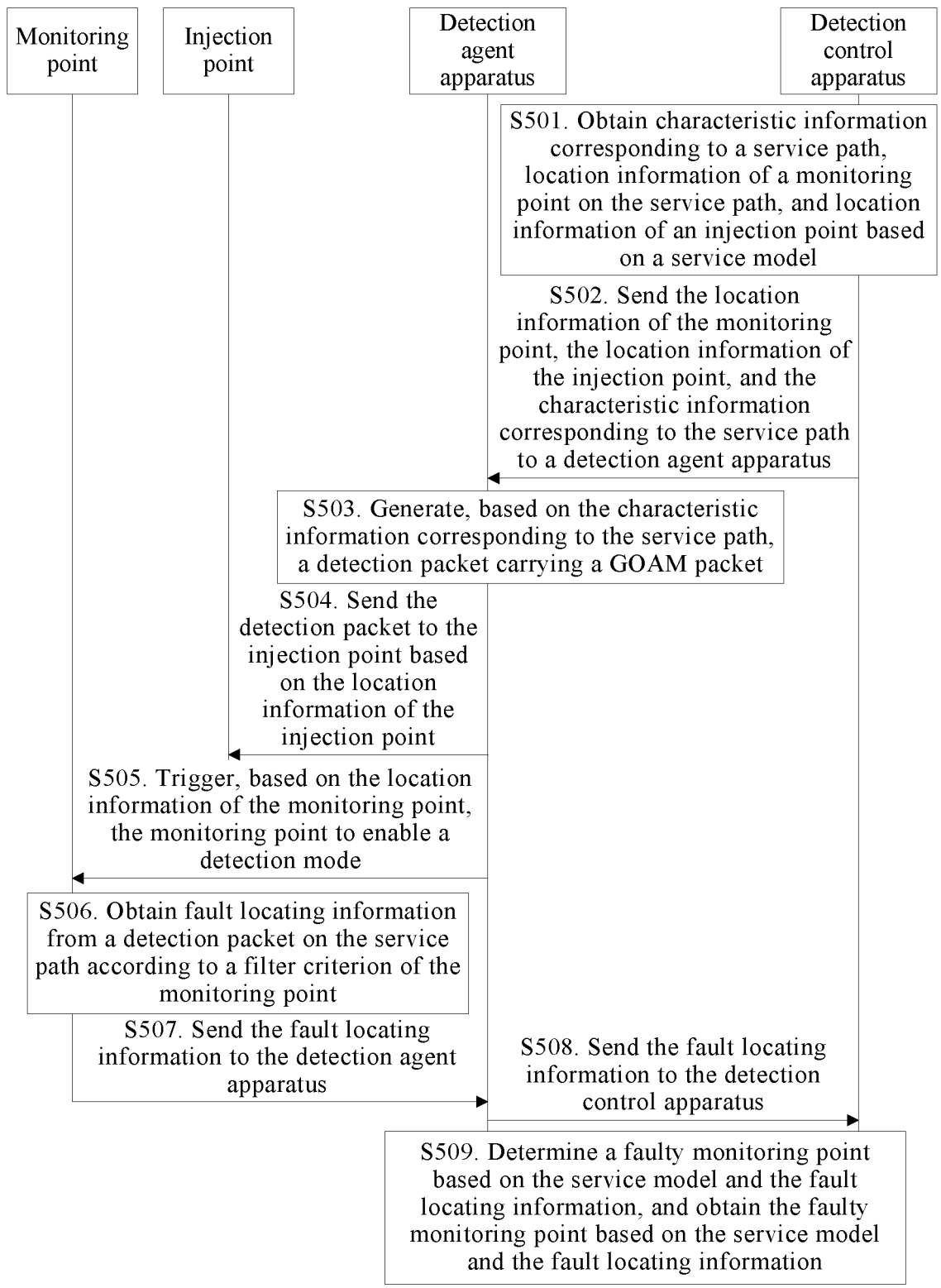
FIG. 5 is a flowchart of a fault detection method in an NFV system according to Embodiment 2 of this application.

FIG. 5 is a flowchart of a fault detection method in an NFV system according to Embodiment 2 of this application. The method provided in Embodiment 2 of this application is an active detection method, that is, the detection agent apparatus injects M GOAM packets into the injection point, and the monitoring point obtains fault locating information from the M GOAM packets forwarded along the service path. The injection point may be injected with the M GOAM packets, and may obtain the fault locating information. Embodiment 2 of this application is described by using only an example in which the injection point is injected with the M GOAM packets. A filter criterion is preset at the monitoring point in a static configuration manner or another manner, and the detection control apparatus may not send the filter criterion of the monitoring point to the monitoring point by using the detection agent apparatus. With reference to FIG. 4 and FIG. 5, the following describes the method provided in Embodiment 2 of this application.

S501. The detection control apparatus obtains characteristic information corresponding to a service path, location information of a monitoring point on the service path, and location information of an injection point based on a service model.

For a method for obtaining, by the detection control apparatus, the location information of the monitoring point on the service path, refer to corresponding content in S301.

For example, the injection point is a node on the service path that is configured to inject the detection packet into the NFV system. The detection control apparatus may select, based on a fault locating requirement, the injection point from nodes included in the service path. Optionally, the detection control apparatus may select one injection point from a plurality of monitoring points included in the service path. For example, if the fault locating requirement is performing fault detection for the VNF, the injection point may be selected from monitoring points distributed in the VNF. For example, the detection control apparatus may select the vNIC 1 as the injection point. If the fault locating requirement is performing fault detection for an NFVI, the injection point may be selected from monitoring points distributed in the NFVI. For example, the detection control apparatus may select a NIC 3 as the injection point.

For example, the characteristic information is information required for generating a detection packet. The detection packet is a to-be-captured packet, for example, a GOAM packet, based on which the monitoring point obtains fault locating information. The characteristic information corresponding to the service path includes: a first identifier of the to-be-captured packet and a destination address of the to-be-captured packet. The destination address is the same as a destination address carried in the service packet in Embodiment 1 of this application, and this can ensure that a path along which the detection packet injected into the NFV system passes is the same as a path along which the service packet in Embodiment 1 passes. The first identifier is an identifier determined through negotiation by the detection agent apparatus, the detection control apparatus, and the monitoring point. The first identifier is used to identify a packet carrying the first identifier as a detection packet. Optionally, the detection packet may include a GOAM packet and outer encapsulation. The GOAM packet may have a structure shown in FIG. 8. The outer encapsulation includes an IP header, an Internet Control Message Protocol (ICMP) header, or a UDP header. If the detection packet is an IP packet, the GOAM packet may be carried in a payload of the IP packet. If the detection packet is an ICMP packet, the GOAM packet may be carried in data of the ICMP packet. If the detection packet is a UDP packet, the GOAM packet may be carried in data of the UDP packet. A Sequence field of the GOAM packet may be used to carry a sequence number. In an implementation, a Cookie field of the GOAM packet may be used to carry the first identifier. In another implementation, a parameter carried in an Identifier field of the GOAM packet may be used to identify the GOAM packet more precisely. When parameters carried in Cookie fields of different GOAM packets are the same, the different GOAM packets are further differentiated by using Identifier fields. Optionally, the first identifier includes the parameter carried in the Cookie field and the parameter carried in the Identifier field.

For example, the detection control apparatus may generate the service model before S501. For a method, refer to the method provided in Embodiment 1. In the method provided in Embodiment 2, the detection control apparatus may further add the first identifier to the service model when generating the service model. The destination address included in the characteristic information is location information of the last node of the service path. In another possible implementation, the detection control apparatus obtains the location information of the last node from the service model. The detection control apparatus obtains the characteristic identifier based on the location information of the last node and the first identifier obtained through negotiation. The first identifier obtained through negotiation is an identifier determined after the detection control apparatus negotiates with the detection agent apparatus and the monitoring point.

Optionally, the characteristic information corresponding to the service path further includes a second identifier. The second identifier is used to identify a service or a service path. The second identifier is an identifier allocated by the detection control apparatus, or is an allocated identifier on the detection control apparatus. The detection control apparatus may add the second identifier to the service model when generating the service model. If the detection control apparatus does not add the second identifier to the service model, the detection control apparatus may determine the second identifier based on the location information of the monitoring point and a correspondence. The correspondence includes the location information of the monitoring point and the second identifier.

S502. The detection control apparatus sends the location information of the monitoring point, the location information of the injection point, and the characteristic information corresponding to the service path to the detection agent apparatus.

Optionally, after determining the injection point, the detection control apparatus may directly notify the detection agent apparatus of location information of a monitoring point that is selected as the injection point, and does not need to send the location information of the injection point to the detection agent apparatus.

A manner of communication between the detection control apparatus and the detection agent apparatus is the same as that in Embodiment 1. Details are not described herein again.

S503. The detection agent apparatus generates, based on the characteristic information corresponding to the service path, a detection packet carrying a GOAM packet.

For example, a detection packet template may be statically configured on the detection agent apparatus. The detection packet template includes the GOAM packet shown in FIG. 8 and outer encapsulation. The outer encapsulation is determined by a service path along which the detection packet passes. The outer encapsulation may include IP encapsulation, ICMP encapsulation, UDP encapsulation, or tunnel encapsulation. The tunnel encapsulation may be IP tunnel encapsulation, or that the detection agent apparatus generates a detection packet carrying a GOAM packet includes: adding, by the detection agent apparatus, the first identifier and the destination address that are included in the characteristic information to the template, to obtain the detection packet carrying the GOAM packet. The first identifier is added to the Cookie field in FIG. 8, or the first identifier is added to the Cookie field and the Identifier field in FIG. 8. The destination address is added to a destination address field in the outer encapsulation included in the packet.

Optionally, the characteristic information further includes the second identifier. Detection packet templates corresponding to different services are statically configured on the detection agent apparatus. That the detection agent apparatus generates a detection packet carrying a GOAM packet may include: obtaining, by the detection agent apparatus, a first template based on the second identifier included in the characteristic information, where the first template is a detection packet template corresponding to the second identifier; and adding, by the detection agent apparatus, the first identifier and the destination address that are included in the characteristic information to the template, to obtain the detection packet carrying the GOAM packet.

Optionally, the detection agent apparatus may make M−1 copies of the detection packet, to obtain M detection packets. Each of the M detection packets carries the GOAM packet. The GOAM packet further includes a sequence number. The sequence number is used to identify a sequence in which the GOAM packet carrying the sequence number is injected into the injection point. For example, a value of a sequence number carried in a first GOAM packet is 1. The sequence number whose value is 1 indicates that the first GOAM packet is a GOAM packet carried in a first detection packet, and the first detection packet is the first detection packet injected into the injection point. A value of a sequence number carried in an $i^{th}$ GOAM packet is i, and i is a value greater than or equal to 2 and less than or equal to M. The sequence number whose value is i indicates that the $i^{th}$ GOAM packet is a GOAM packet carried in an $i^{th}$ detection packet, and the $i^{th}$ detection packet is the $i^{th}$ detection packet injected into the injection point. All content but the sequence number of the first GOAM packet may be the same as that of the $i^{th}$ GOAM packet.

S504. The detection agent apparatus sends the detection packet to the injection point based on the location information of the injection point.

If the detection agent apparatus generates only one detection packet, the detection agent apparatus sends the one detection packet to the injection point. For example, the detection agent apparatus sends the one detection packet to the vNIC 1. If the detection agent apparatus generates M detection packets, the detection agent apparatus may sequentially send the M detection packets to the injection point based on a preset time interval according to sequence numbers carried in the M detection packets.

The method provided in Embodiment 2 of this application is mainly described by using an example in which the detection agent apparatus sends the one detection packet to the injection point. An embodiment in which a plurality of detection packets are injected into the injection point is not described.

For example, after receiving the detection packet, the injection point sends the detection packet along the service path based on a destination address included in the detection packet. Optionally, before sending the detection packet along the service path, the injection point may learn, based on a first identifier carried in the detection packet, that a packet carrying the first identifier is the detection packet.

A manner of communication between the detection agent apparatus and the injection point is the same as the manner of communication between the detection agent apparatus and the monitoring point in Embodiment 1. Details are not described herein again.

S505. The detection agent apparatus triggers, based on the location information of the monitoring point, the monitoring point to enable a detection mode.

For example, for a method for triggering, by the detection agent apparatus, the monitoring point to enable the detection mode, refer to corresponding content in Embodiment 1. The detection mode is a working mode of capturing the detection packet on the service path and obtaining the fault locating information.

A manner of communication between the detection agent apparatus and the injection point is the same as that in Embodiment 1. Details are not described herein again.

Optionally, if the monitoring point is in the detection mode after being started, the detection agent apparatus may not need to trigger the monitoring point to enable the detection mode. In other words, S505 is optional.

S506. The monitoring point obtains fault locating information from a detection packet on the service path according to a filter criterion of the monitoring point.

Optionally, the filter criterion of the monitoring point is statically configured. Alternatively, the monitoring point may obtain the filter criterion by using a manner in Embodiment 1. Details are not described herein again.

The monitoring point may use the method of S304 in Embodiment 1 to obtain the fault locating information. The monitoring point may obtain the fault locating information from the detection packet in a snapshot manner according to the filter criterion.

Optionally, the monitoring point can rapidly identify a detection packet based on the first identifier carried in the detection packet, thereby reducing a detection packet mistaken identification rate.

For example, if a packet forwarded along the service path is a UDP packet, a filter criterion configured on the vNIC 1 used as the monitoring point includes six rules. The filter criterion may be denoted as follows:

```
<snifferRule>
  <ruleNo>1</ruleNo>
  <conditions>
    <condition>
      <offset>46</offset>
      <!-- identifier of GOAM packet -->
      <value>0x4a3b2c1d</v lue>
      <length>4</length>
    </condition>
    <condition>
      <offset>26</offset>
      <!-- source IP address 10.136.157.67 -->
      <value>0x0a889d43</value>
      <length>4</length>
    </condition>
    <condition>
      <offset>30</offset>
      <!-- destination IP address 10.136.157.66 -->
      <value>0x0a889d42</value>
      <length>4</length>
    </condition>
    <condition>
      <offset>23</offset>
      <!-- protocol number -->
      <value>0x11</value>
      <length>1</length>
    </condition>
    <condition>
      <offset>34</offset>
      <!-- source port number -->
      <value>0xe518</value>
      <length>2</length>
    </condition>
    <condition>
      <offset>36</offset>
      <!-- destination port number -->
      <value>0xbac1</value>
      <length>2</length>
    </condition>
  </conditions>
</snifferRule>
```

In the foregoing filter criterion configured on the vNIC 1, snifferRule represents the filter criterion of the monitoring point, and a condition represents any rule. A rule 1 is used as an example. The rule includes six rules, namely, six conditions. The six rules include a first rule, a second rule, a third rule, a fourth rule, a fifth rule, and a sixth rule. The first rule is related to a first identifier used to identify the GOAM packet. The first rule indicates that a field whose offset is 46 and whose length is 4 carries the first identifier, and the first identifier is 0x4a3b2c1d. The field whose offset is 46 and whose length is 4 is a Cookie field of the GOAM packet. The second rule is related to a source IP address. The second rule indicates that a field whose offset is 26 and whose length is 4 carries a source IP address, and the source IP address is 0x0a889d43. An IP address represented by 0x0a889d43 is 10.136.157.67. The third rule is related to a destination IP address. The third rule indicates that a field whose offset is 30 and whose length is 4 carries a destination IP address, and the destination IP address is 0x0a889d42. An IP address represented by 0x0a889d42 is 10.136.157.66. The fourth rule is related to a protocol number. The fourth rule indicates that a field whose offset is 23 and whose length is 1 carries a protocol number, and the protocol number is 0x11. 0x11 indicates that the packet is a UDP packet. The fifth rule is related to a source port number. The fifth rule indicates that a field whose offset is 34 and whose length is 2 carries a source port number, and the source port number is 0xe518. The sixth rule is related to a destination port number. The sixth rule indicates that a field whose offset is 36 and whose length is 2 carries a destination port number, and the destination port number is 0xbac1.

For example, if the UDP packet enters a Virtual Extensible LAN (VXLAN) tunnel after being forwarded by the vBNG, that is, IPv4 encapsulation is added to an outer layer of the UDP packet that has been forwarded by the vBNG, a filter criterion configured on the vNIC 2 used as a monitoring point includes six rules. The filter criterion configured on the vNIC 2 that is used as the monitoring point may be denoted as follows:

```
<snifferRule>
  <ruleNo>1</ruleNo>
  <conditions>
    <condition>
      <offset>96</offset>
      <!-- identifier of GOAM packet -->
      <value>0x4a3b2c1d</value>
      <length>4</length>
    </condition>
    <condition>
      <offset>76</offset>
      <!-- source IP address 10.136.157.67 -->
      <value>0x0a889d43</value>
      <length>4</length>
    </condition>
    <condition>
      <offset>80</offset>
      <!-- destination IP address 10.136.157.66 -->
      <value>0x0a889d42</value>
      <length>4</length>
    </condition>
    <condition>
      <offset>73</offset>
      <!-- protocol number -->
      <value>0x11</value>
      <length>1</length>
    </condition>
    <condition>
      <offset>84</offset>
      <!-- source port number -->
      <value>0xe518</value>
      <length>2</length>
    </condition>
    <condition>
      <offset>86</offset>
      <!-- destination port number -->
      <value>0xbac1</value>
      <length>2</length>
```

-continued

```
    </condition>
  </conditions>
</snifferRule>
```

In the foregoing filter criterion configured on the vNIC 2, snifferRule represents the filter criterion of the monitoring point, and a condition represents any rule. A rule 1 is used as an example. The rule includes six rules, namely, six conditions. The six conditions include a seventh rule, an eighth rule, a ninth rule, a tenth rule, an eleventh rule, and a twelfth rule. The seventh rule is related to a first identifier used to identify the GOAM packet. The seventh rule indicates that a field whose offset is 96 and whose length is 4 carries the first identifier, and the first identifier is 0x4a3b2c1d. The field whose offset is 96 and whose length is 4 is a Cookie field of the GOAM packet. The eighth rule is related to a source IP address. The eighth rule indicates that a field whose offset is 76 and whose length is 4 carries a source IP address, and the source IP address is 0x0a889d43. An IP address represented by 0x0a889d43 is 10.136.157.67. The ninth rule is related to a destination IP address. The ninth rule indicates that a field whose offset is 80 and whose length is 4 carries a destination IP address, and the destination IP address is 0x0a889d42. An IP address represented by 0x0a889d42 is 10.136.157.66. The tenth rule is related to a protocol number. The tenth rule indicates that a field whose offset is 73 and whose length is 1 carries a protocol number, and the protocol number is 0x11. 0x11 indicates that the packet is a UDP packet. The eleventh rule is related to a source port. The eleventh rule indicates that a field whose offset is 84 and whose length is 2 carries a source port number, and the source port number is 0xe518. The twelfth rule is related to a destination port. The twelfth rule indicates that a field whose offset is 86 and whose length is 2 carries a destination port number, and the destination port number is 0xbac1. A packet received by the vNIC 2 is a UDP packet with IPv4 encapsulated in an outer layer. Location information of a Cookie field and 5-tuple information (a source IP address, a destination IP address, a protocol number, a source port, and a destination port) in a packet header changes. To accurately obtain the Cookie field and the 5-tuple information in the packet header, the value of offset in the filter criterion configured on the vNIC 2 needs to be adjusted correspondingly.

S507. The monitoring point sends the fault locating information to the detection agent apparatus.

The monitoring point may use the method of S305 in Embodiment 1 to send the fault locating information to the detection agent apparatus.

S508. The detection agent apparatus sends the fault locating information to the detection control apparatus.

The detection agent apparatus may use the method of S306 in Embodiment 1 to send the fault locating information to the detection control apparatus.

S509. The detection control apparatus determines a faulty monitoring point based on the service model and the fault locating information.

The detection control apparatus may use the method of S307 in Embodiment 1 to determine the faulty monitoring point.

According to the fault detection method in the NFV system provided in Embodiment 2 of this application, the detection control apparatus sends the location information of the monitoring point, the location information of the injection point, and the characteristic information corresponding to the service path to the detection agent apparatus. The detection agent apparatus may obtain the detection packet based on the characteristic information corresponding to the service path, and inject the detection packet into the service path by using the injection point. The monitoring point may capture, based on the configured filter criterion, information carried in the detection packet on the service path, to obtain the fault locating information. The detection agent apparatus sends, to the detection control apparatus, the fault locating information sent by the monitoring point, so that the detection control apparatus can analyze and determine a faulty monitoring point. In the method provided in Embodiment 2 of this application, the detection packet may be actively injected into the service path, so that fault detection and locating can be performed at any time.

Figure 6:
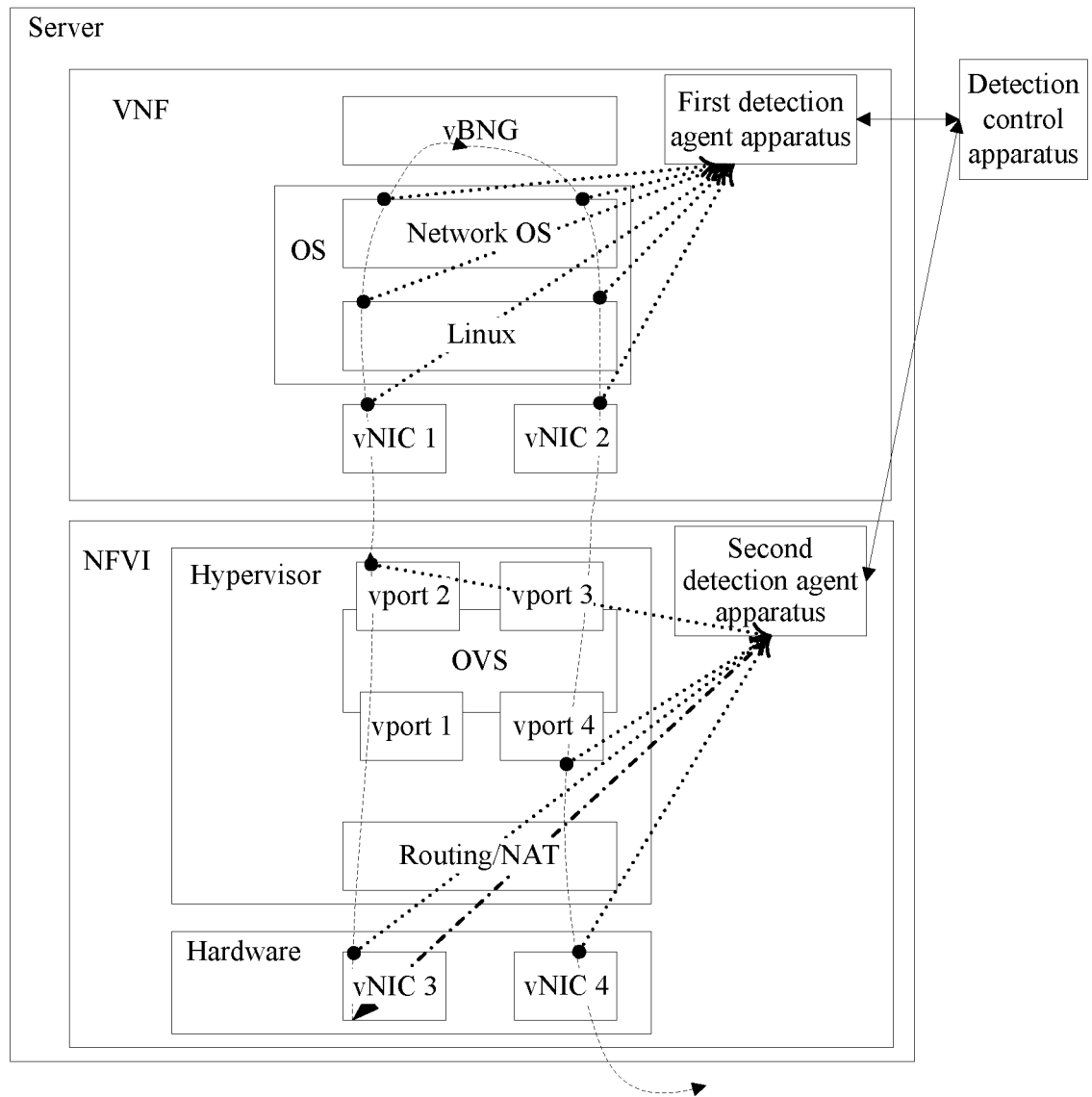
FIG. 6 is a schematic diagram of a scenario according to Embodiment 3 of this application.

FIG. 6 is a schematic diagram of a scenario according to Embodiment 3 of this application. The scenario provided in Embodiment 3 of this application is different from the scenario provided in FIG. 2 or FIG. 4 in that a server includes a first detection agent apparatus and a second detection agent apparatus, the first detection agent apparatus is disposed in a VNF, the second detection agent apparatus is disposed in an NFVI, and a detection control apparatus may be a device independent of the server. The first detection agent apparatus and the second detection agent apparatus can communicate with the detection control apparatus. The first detection agent apparatus can communicate with another module or element included in the VNF. The second detection agent apparatus can communicate with another module or element included in the NFVI. In the scenario provided in Embodiment 3 of this application, the second detection agent apparatus may inject a detection packet by using a NIC 3. The detection packet may be forwarded along a path marked by a dashed line in FIG. 6. The path marked by the dashed line in FIG. 6 is the same as the path marked by the dashed line in FIG. 2.

Figure 7A:
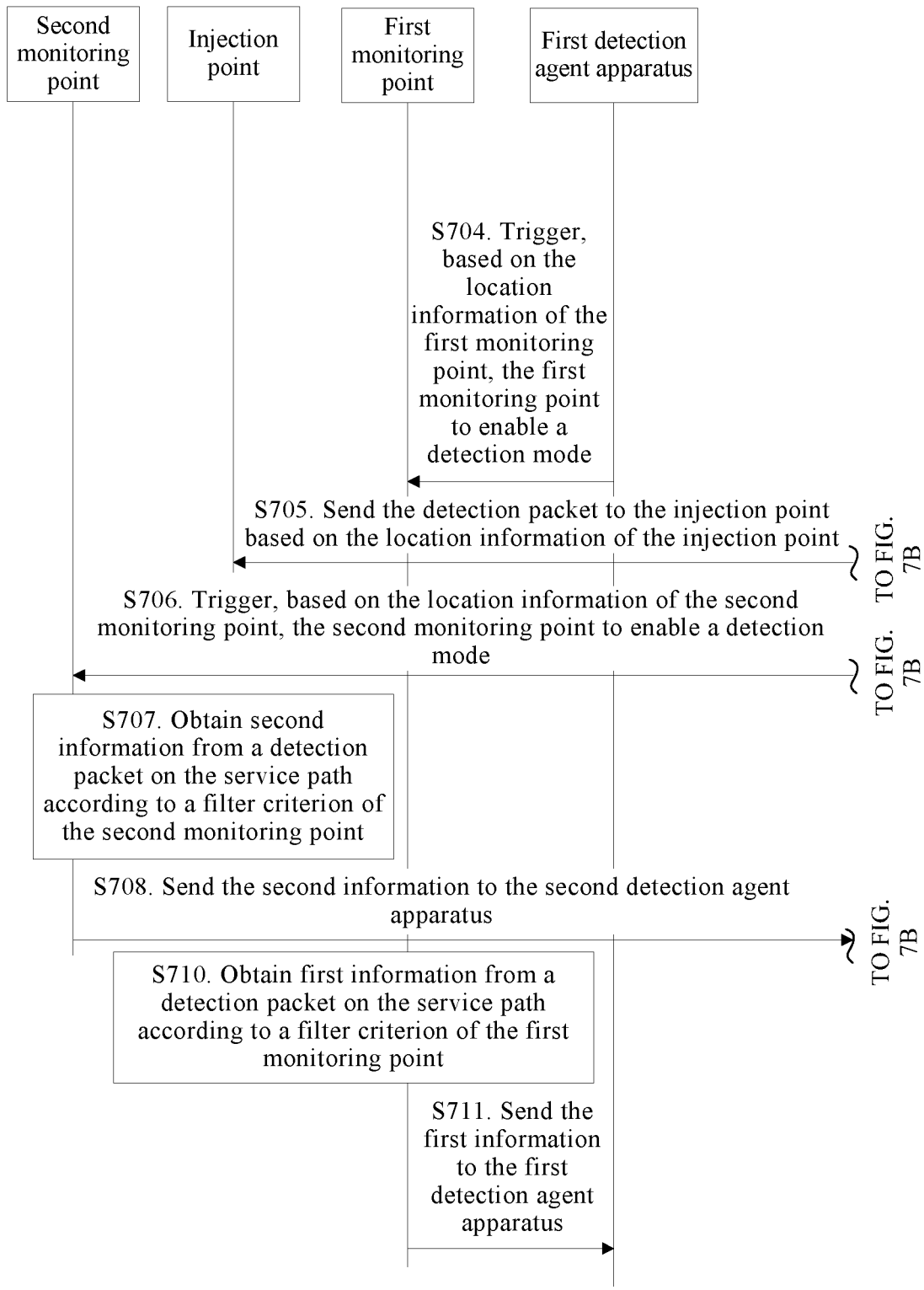
FIG. 7A and FIG. 7B are a flowchart of a fault detection method in an NFV system according to Embodiment 3 of this application.
Figure 7B:
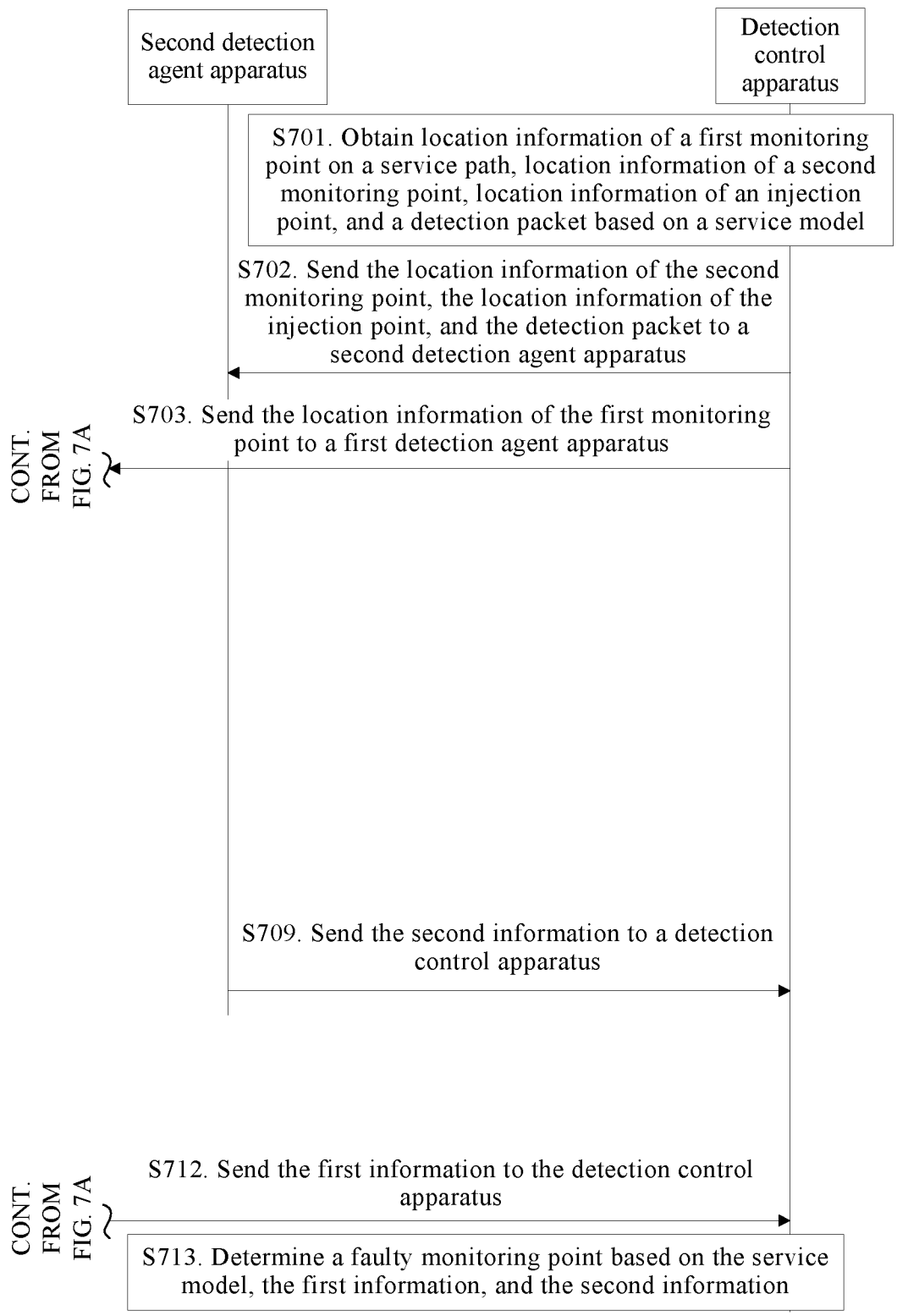

FIG. 7A and FIG. 7B are a flowchart of a fault detection method in an NFV system according to Embodiment 3 of this application. The method provided in Embodiment 3 of this application is an active detection method, that is, the second detection agent apparatus injects a detection packet generated by the detection control apparatus into an injection point, and the monitoring point obtains fault locating information from the detection packet forwarded along a service path. The injection point is configured to inject the detection packet. In Embodiment 3 of this application, the active detection method is merely used as an example for description. Optionally, a filter criterion of the monitoring point may be configured on the monitoring point in a static configuration manner. In this way, the detection control apparatus may not send the filter criterion of the monitoring point to the monitoring point by using the detection agent apparatus. With reference to FIG. 6, and FIG. 7A and FIG. 7B, the following describes the method provided in Embodiment 3 of this application.

S701. The detection control apparatus obtains location information of a first monitoring point on a service path, location information of a second monitoring point, location information of an injection point, and a detection packet based on a service model.

A method for obtaining, by the detection control apparatus, the location information of the first monitoring point on the service path, the location information of the second monitoring point, and the location information of the injection point based on the service model is the same as S501. Details are not described herein again. A method for selecting, by the detection control apparatus, the injection point is the same as that in Embodiment 2. Optionally, the injection point is a monitoring point different from both the first monitoring point and the second monitoring point. A method for generating, by the detection control apparatus, the detection packet is the same as the method for generating, by the detection agent apparatus, the detection packet in S503. Details are not described herein again.

For example, the first detection agent apparatus is disposed in the VNF, and the first detection agent apparatus is configured to obtain fault locating information from a monitoring point located in the VNF. Based on location information of the first detection agent apparatus, the first monitoring point is a monitoring point located in the VNF. For example, the first monitoring point is located in a vNIC 1, a vNIC 2, Linux, a network OS, or a vBNG. The second detection agent apparatus is disposed in the NFVI, and the second detection agent apparatus is configured to obtain fault locating information from a monitoring point located in the NFVI. Based on location information of the second detection agent apparatus, the second monitoring point is a monitoring point located in the NFVI. For example, the second monitoring point is located in a NIC 3, a NIC 4, a vport 4, or a vport 2.

S702. The detection control apparatus sends the location information of the second monitoring point, the location information of the injection point, and the detection packet to the second detection agent apparatus.

A method of S702 is the same as the method of S502. Details are not described herein again. The detection control apparatus may use the communications protocol that is used by the detection control apparatus in Embodiment 1, to communicate with the second detection agent apparatus.

S703. The detection control apparatus sends the location information of the first monitoring point to the first detection agent apparatus.

A method of S703 is the same as the method of S502. Details are not described herein again. The detection control apparatus may use the communications protocol that is used by the detection control apparatus in Embodiment 1, to communicate with the first detection agent apparatus. Optionally, the detection control apparatus may first perform S703, and then perform S702. Optionally, the detection control apparatus may perform S702 and S703 concurrently.

S704. The first detection agent apparatus triggers, based on the location information of the first monitoring point, the first monitoring point to enable a detection mode.

A method of S704 is the same as the method of S505. Details are not described herein again. S704 is performed after S703, and a sequence of performing S704 and S702 is not limited. The first detection agent apparatus may use the communications protocol that is used by the detection agent apparatus and the monitoring point in Embodiment 1, to communicate with the first monitoring point.

S705. The second detection agent apparatus sends the detection packet to the injection point based on the location information of the injection point.

A method of S705 is the same as the method of S504. Details are not described herein again. S705 is performed after S702, and a sequence of performing S705 and S703 or S704 is not limited. The second detection agent apparatus may use the communications protocol that is used by the detection agent apparatus and the monitoring point in Embodiment 1, to communicate with the injection point.

S706. The second detection agent apparatus triggers, based on the location information of the second monitoring point, the second monitoring point to enable a detection mode.

A method of S706 is the same as the method of S505. Details are not described herein again. S706 is performed after S702, and a sequence of performing S706 and S703, S704, or S705 is not limited. The second detection agent apparatus may use the communications protocol that is used by the detection agent apparatus and the monitoring point in Embodiment 1, to communicate with the second monitoring point.

S707. The second monitoring point obtains second information from a detection packet on the service path according to a filter criterion of the second monitoring point.

The second information is fault locating information obtained by the second monitoring point. The detection packet in S707 is a detection packet received by the second monitoring point. A method of S707 is the same as the method of S506. Details are not described herein again.

S708. The second monitoring point sends the second information to the second detection agent apparatus.

A method of S708 is the same as the method of S507. Details are not described herein again.

S709. The second detection agent apparatus sends the second information to the detection control apparatus.

A method of S709 is the same as the method of S508. Details are not described herein again.

S710. The first monitoring point obtains first information from a detection packet on the service path according to a filter criterion of the first monitoring point.

The first information is fault locating information obtained by the first monitoring point. The detection packet in S710 is a detection packet different from the detection packet in S707. Information carried in the detection packet in S707 changes after the detection packet in S707 is forwarded by a node between the first monitoring point and the second monitoring point. The detection packet in S710 is a detection packet received by the first monitoring point.

A method of S710 is the same as the method of S506. Details are not described herein again. S710 is performed after S705 and S704, and a sequence of performing S710 and S706, S707, S708, or S709 is not limited.

S711. The first monitoring point sends the first information to the first detection agent apparatus.

A method of S711 is the same as the method of S507. Details are not described herein again.

S712. The first detection agent apparatus sends the first information to the detection control apparatus.

A method of S712 is the same as the method of S508. Details are not described herein again.

S713. The detection control apparatus determines a faulty monitoring point based on the service model, the first information, and the second information.

A method of S713 is the same as the method of S509. Details are not described herein again.

In the method provided in Embodiment 3 of this application, the first detection agent apparatus detects and locates a fault in the VNF, and the second detection agent apparatus detects and locates a fault in the NFVI, helping further improve fault locating efficiency.

In the method provided in any one of Embodiment 1 to Embodiment 3 of this application, alternatively, the GOAM packet may be replaced with packets of other formats for simulating a service packet. Herein, the packets of other formats for simulating a service packet are not described one by one by using examples.

Figures 8, 9:
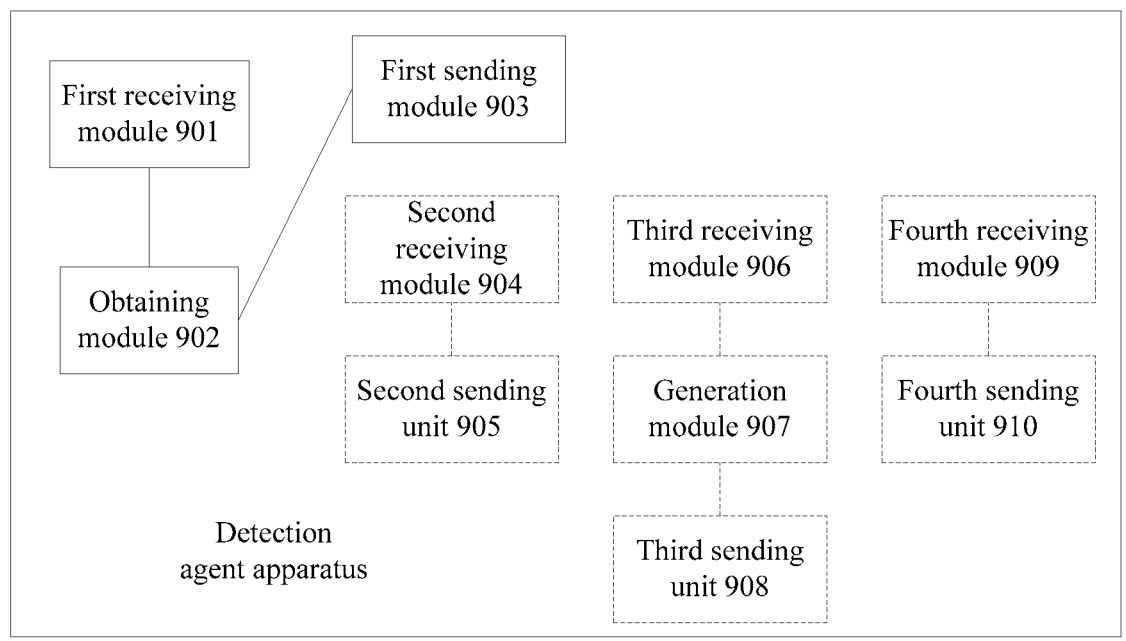
FIG. 8 is a schematic diagram of a GOAM packet according to an embodiment of this application.
FIG. 9 is a schematic structural diagram of a detection agent apparatus according to Embodiment 1 of this application.

FIG. 9 is a schematic structural diagram of a detection agent apparatus according to Embodiment 1 of this application. The detection agent apparatus provided in Embodiment 1 of this application is located in an NFV system. The detection agent apparatus provided in Embodiment 1 of this application may be the detection agent apparatus in any one of the embodiments corresponding to FIG. 2 to FIG. 7A and FIG. 7B. For same content, refer to corresponding content in FIG. 2 to FIG. 7A and FIG. 7B. Details are not described in this embodiment again.

The detection agent apparatus provided in Embodiment 1 of this application includes a first receiving module 901, an obtaining module 902, and a first sending module 903. The obtaining module 902 can communicate with the first receiving module 901 and the first sending module 903.

The first receiving module 901 is configured to receive location information of a monitoring point on a service path that is sent by a detection control apparatus. The obtaining module 902 is configured to obtain fault locating information from the monitoring point based on the location information of the monitoring point, where the fault locating information is information obtained by the monitoring point according to a filter criterion, and the fault locating information includes the location information of the monitoring point. The first sending module 903 is configured to send the fault locating information to the detection control apparatus.

Optionally, the detection agent apparatus further includes a second receiving module 904 and a second sending module 905. The second receiving module 904 can communicate with the second sending module 905. The second receiving module 904 is configured to receive a detection packet and location information of an injection point on the service path that are sent by the detection control apparatus, where the detection packet is a to-be-captured packet based on which the monitoring point obtains the fault locating information. The second sending module 905 is configured to send the detection packet to the injection point.

Optionally, the detection agent apparatus further includes a third receiving module 906, a generation module 907, and a third sending module 908. The third receiving module 906 can communicate with the generation module 907 and the third sending module 908. The generation module 907 can communicate with the third sending module 908. The third receiving module 906 is configured to receive characteristic information corresponding to the service path and location information of an injection point on the service path that are sent by the detection control apparatus. The generation module 907 is configured to generate M detection packets based on the characteristic information corresponding to the service path, where M is an integer greater than or equal to 1, and any one of the M detection packets is a to-be-captured packet based on which the monitoring point obtains the fault locating information. The third sending module 908 is configured to send the M detection packets to the injection point.

Optionally, the fault locating information is information that is obtained after the monitoring point filters a service packet forwarded along the service path; or the fault locating information is information that is obtained after the monitoring point filters a detection packet forwarded along the service path. The detection packet may be a packet sent to the injection point by the detection agent apparatus and injected by the injection point.

Optionally, the detection agent apparatus further includes a fourth receiving module 909 and a fourth sending module 910. The fourth receiving module 909 can communicate with the fourth sending module 910. The fourth receiving module 909 is configured to receive the filter criterion of the monitoring point that is sent by the detection control apparatus, where the filter criterion is used for obtaining the fault locating information from a to-be-filtered packet. The fourth sending module 910 is configured to send the filter criterion of the monitoring point to the monitoring point based on the location information of the monitoring point.

For example, the obtaining module 902 is configured to periodically read the fault locating information from the monitoring point, or the obtaining module 902 is configured to receive the fault locating information periodically sent by the monitoring point.

Optionally, the obtaining module 902 includes a first submodule. The first submodule is configured to periodically read the fault locating information from the monitoring point.

Optionally, the obtaining module 902 includes a second submodule. The second submodule is configured to receive the fault locating information periodically sent by the monitoring point.

Figure 10:
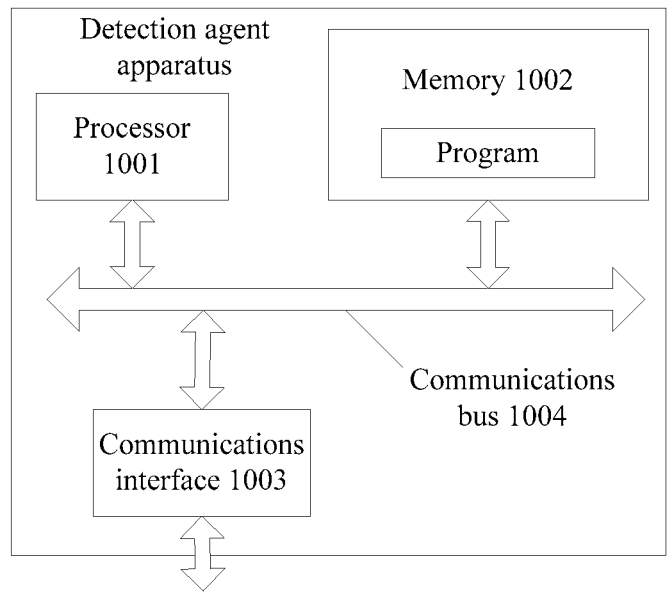
FIG. 10 is a schematic structural diagram of a detection agent apparatus according to Embodiment 2 of this application.

FIG. 10 is a schematic structural diagram of a detection agent apparatus according to Embodiment 2 of this application. The detection agent apparatus provided in Embodiment 2 of this application may be located in an NFV system. The detection agent apparatus provided in Embodiment 2 of this application may be the detection agent apparatus in any one of the embodiments corresponding to FIG. 2 to FIG. 7A and FIG. 7B. For same content, refer to corresponding content in FIG. 2 to FIG. 7A and FIG. 7B. Details are not described in this embodiment again. The detection agent apparatus provided in Embodiment 2 of this application and the detection agent apparatus provided in Embodiment 1 of this application may be a same apparatus. It may be considered that, FIG. 10 shows a structure included in the detection agent apparatus from a physical perspective, and FIG. 9 shows a structure included in the detection agent apparatus from a logical perspective.

The detection agent apparatus provided in Embodiment 2 of this application includes a processor 1001, a memory 1002, and a communications interface 1003. The processor 1001, the memory 1002, and the communications interface 1003 may communicate with each other. Optionally, the processor 1001, the memory 1002, and the communications interface 1003 may communicate with or may be connected to each other by using a communications bus 1004. The memory 1002 is configured to store a program. The processor 1001 may execute the program stored in the memory 1002 or an executable instruction included in the program, to perform the method performed by the detection agent apparatus in any one of the embodiments corresponding to FIG. 2 to FIG. 5 or by the first detection agent apparatus in FIG. 6 and FIG. 7A and FIG. 7B.

For example, the processor 1001 executes the program stored in the memory 1002 or the executable instruction included in the program, to perform the following operations: receiving, by using the communications interface 1003, location information of a monitoring point on a service path that is sent by a detection control apparatus; obtaining fault locating information from the monitoring point based on the location information of the monitoring point, where the fault locating information is information obtained by the monitoring point according to a filter criterion, and the fault locating information includes the location information of the monitoring point; and sending the fault locating information to the detection control apparatus by using the communications interface 1003.

For other content performed by the processor 1001, refer to corresponding content in the foregoing embodiments. Details are not described herein again.

Figure 11:
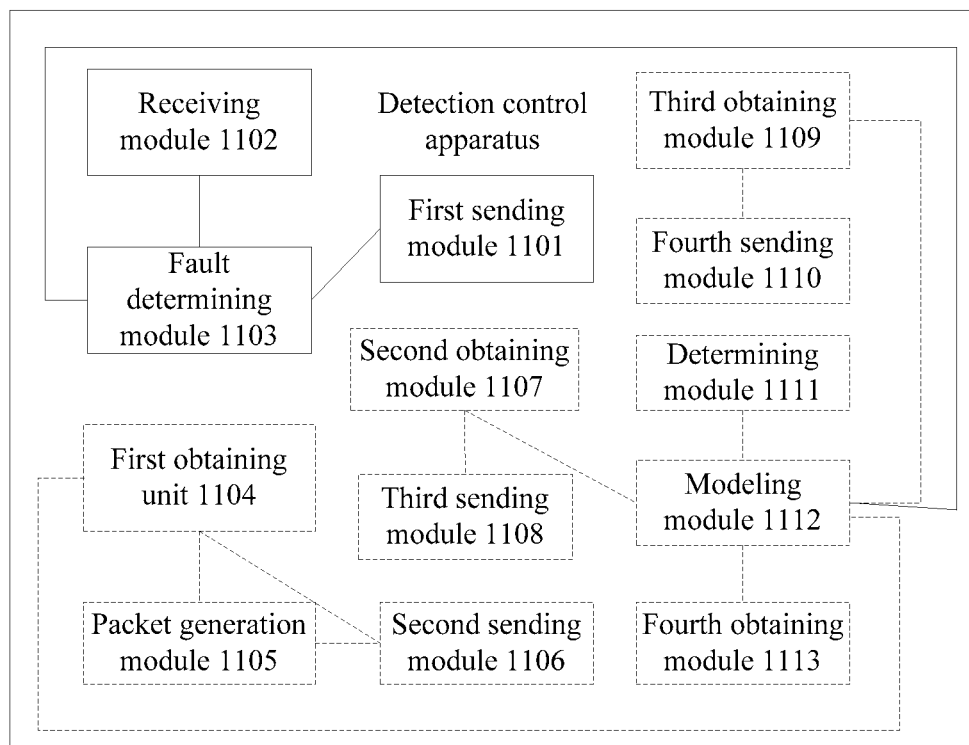
FIG. 11 is a schematic structural diagram of a detection control apparatus according to Embodiment 1 of this application.

FIG. 11 is a schematic structural diagram of a detection control apparatus according to Embodiment 1 of this application. The detection control apparatus provided in Embodiment 1 of this application may be a device independent of a server. For example, the detection control apparatus may be located on an NFV management and orchestration (MANO) device, a software-defined networking controller (SDN controller), or a network management device; or the detection control apparatus may be located on a device dedicated to fault locating, such as a personal computer, a server, or a network device. The detection control apparatus provided in Embodiment 1 of this application may be the detection control apparatus in any one of the embodiments corresponding to FIG. 2 to FIG. 7A and FIG. 7B. For same content, refer to corresponding content in FIG. 2 to FIG. 7A and FIG. 7B. Details are not described in this embodiment again.

The detection control apparatus provided in Embodiment 1 of this application includes: a first sending module 1101, a receiving module 1102, and a fault determining module 1103. The fault determining module 1103 can communicate with the first sending module 1101 and the receiving module 1102. The first sending module 1101 is configured to send location information of a monitoring point on a service path to a detection agent apparatus, where the detection agent apparatus is located in an NFV system. The receiving module 1102 is configured to receive fault locating information sent by the detection agent apparatus, where the fault locating information is information obtained by the monitoring point according to a filter criterion, and the fault locating information includes the location information of the monitoring point. The fault determining module 1103 is configured to determine a faulty monitoring point in the NFV system based on the fault locating information and a service model corresponding to the service path.

Optionally, the detection control apparatus further includes a first obtaining module 1104, a packet generation module 1105, and a second sending module 1106. The packet generation module 1105 can communicate with the first obtaining module 1104 and the second sending module 1106. The second sending module 1106 can communicate with the first obtaining module 1104. The first obtaining module 1104 is configured to obtain characteristic information corresponding to the service path and location information of an injection point on the service path based on the service model, where the characteristic information is information required for generating a detection packet. The packet generation module 1105 is configured to generate the detection packet based on the characteristic information, where the detection packet is a to-be-captured packet based on which the monitoring point obtains the fault locating information. The second sending module 1106 is configured to send the detection packet and the location information of the injection point to the detection agent apparatus.

Optionally, the detection control apparatus further includes a second obtaining module 1107 and a third sending module 1108. The second obtaining module 1107 can communicate with the third sending module 1108. The second obtaining module 1107 is configured to obtain characteristic information corresponding to the service path and location information of an injection point on the service path based on the service model, where the characteristic information is information required for generating a detection packet by the detection agent apparatus, and the detection packet is a to-be-captured packet based on which the monitoring point obtains the fault locating information. The third sending module 1108 is configured to send the characteristic information and the location information of the injection point to the detection agent apparatus.

Optionally, the detection control apparatus further includes a third obtaining module 1109 and a fourth sending module 1110. The third obtaining module 1109 can communicate with the fourth sending module 1110. The third obtaining module 1109 is configured to obtain the filter criterion of the monitoring point based on the service model, where the filter criterion is used for obtaining the fault locating information from a to-be-filtered packet. The fourth sending module 1110 is configured to send the filter criterion of the monitoring point to the detection agent apparatus.

Optionally, the detection control apparatus further includes a determining module 1111, a fourth obtaining module 1113, and a modeling module 1112. The modeling module 1112 can communicate with the determining module 1111 and the fourth obtaining module 1113. The determining module 1111 is configured to determine the first node, the last node, and L intermediate nodes of the service path based on a service, where L is an integer greater than or equal to 0. The fourth obtaining module 1113 is configured to obtain location information of the first node, location information of the last node, location information of each of the L intermediate nodes, a filter criterion of the first node, a filter criterion of the last node, and a filter criterion of each of the L intermediate nodes based on the service path. The modeling module 1112 is configured to obtain the service model based on the location information of the first node, the location information of the last node, the location information of each of the L intermediate nodes, the filter criterion of the first node, the filter criterion of the last node, and the filter criterion of each of the L intermediate nodes.

Optionally, the modeling module 1112 can further communicate with one or more of the fault determining module 1103, the third obtaining module 1109, the second obtaining module 1107, and first obtaining module 1104.

The fault determining module 1103 is configured to: obtain reference values of N parameters based on the service model corresponding to the service path, where the N parameters are parameters carried in a packet forwarded along the service path, N is an integer greater than or equal to 1, and the reference values are pre-estimated values of the N parameters obtained when there is no fault source on the service path; obtain measured values of the N parameters from the fault locating information, where the measured values are actual values of the N parameters obtained from the packet forwarded along the service path; and compare the reference values of the N parameters with the measured values of the N parameters, to determine the faulty monitoring point, where the faulty monitoring point is a monitoring point corresponding to a parameter whose measured value is different from its reference value.

Optionally, the fault determining module 1103 includes a first obtaining submodule, a second obtaining submodule, and a comparison submodule. The comparison submodule can communicate with the first obtaining submodule and the second obtaining submodule. The first obtaining submodule is configured to obtain the reference values of the N parameters based on the service model corresponding to the service path. The second obtaining submodule is configured to obtain the measured values of the N parameters from the fault locating information. The comparison submodule is configured to compare the reference values of the N parameters with the measured values of the N parameters, to determine the faulty monitoring point.

Optionally, the detection control apparatus further includes a trigger module. The trigger module is configured to trigger, by using a NETCONF interface, the detection agent apparatus to obtain the fault locating information.

Figure 12:
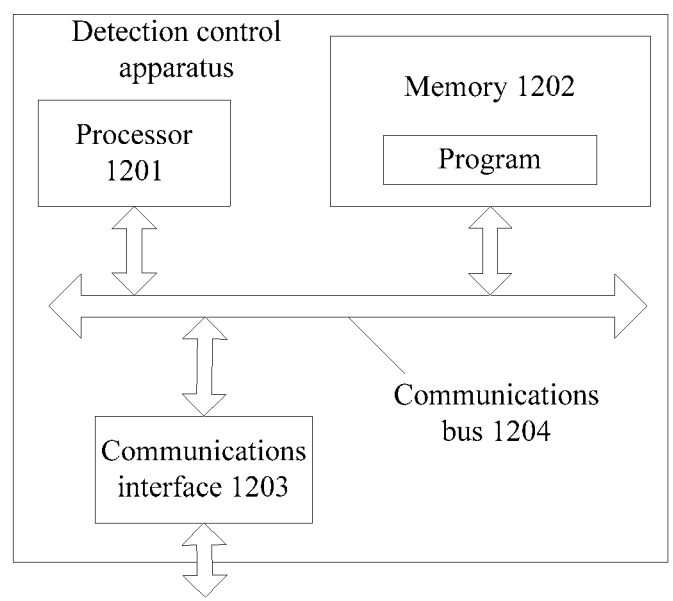
FIG. 12 is a schematic structural diagram of a detection control apparatus according to Embodiment 2 of this application.

FIG. 12 is a schematic structural diagram of a detection control apparatus according to Embodiment 2 of this application. The detection control apparatus provided in Embodiment 2 of this application may be independent of a server. The detection control apparatus provided in Embodiment 2 of this application may be the detection control apparatus in any one of the embodiments corresponding to FIG. 2 to FIG. 7A and FIG. 7B. For same content, refer to corresponding content in FIG. 2 to FIG. 7A and FIG. 7B. Details are not described in this embodiment again. The detection control apparatus provided in Embodiment 2 of this application and the detection control apparatus provided in Embodiment 1 of this application may be a same apparatus. It may be considered that, FIG. 12 shows a structure included in the detection control apparatus from a physical perspective, and FIG. 11 shows a structure included in the detection control apparatus from a logical perspective.

The detection control apparatus provided in Embodiment 2 of this application includes a processor 1201, a memory 1202, and a communications interface 1203. The processor 1201, the memory 1202, and the communications interface 1203 may communicate with each other. Optionally, the processor 1201, the memory 1202, and the communications interface 1203 may communicate with or may be connected to each other by using a communications bus 1204. The memory 1202 is configured to store a program. The processor 1201 may execute the program stored in the memory 1202 or an executable instruction included in the program, to perform the method performed by the detection agent apparatus in any one of the embodiments corresponding to FIG. 2 to FIG. 7A and FIG. 7B.

For example, the processor 1201 may execute the program in the memory 1202 or the executable instruction included in the program, to perform the following operations: sending, by using the communications interface 1203, location information of a monitoring point on a service path to a detection agent apparatus in the NFV system; receiving, by using the communications interface 1203, the fault locating information sent by the detection agent apparatus, where the fault locating information is information obtained by the monitoring point according to a filter criterion, and the fault locating information includes the location information of the monitoring point; and determining a faulty monitoring point in the NFV system based on the fault locating information and a service model corresponding to the service path.

For other content performed by the processor 1201, refer to corresponding content in the foregoing embodiments. Details are not described herein again.

An embodiment of this application further provides a fault detection system. The system provided in this embodiment of this application is configured to detect a fault in an NFV system. The system provided in this embodiment of this application may include the detection agent apparatus shown in FIG. 9 and the detection control apparatus shown in FIG. 11; or the system provided in this embodiment of this application may include the detection agent apparatus shown in FIG. 10 and the detection control apparatus shown in FIG. 12; or the system provided in this embodiment of this application may include the detection agent apparatus shown in FIG. 10 and the detection control apparatus shown in FIG. 11; or the system provided in this embodiment of this application may include the detection agent apparatus shown in FIG. 9 and the detection control apparatus shown in FIG. 12. For a structure included in the system provided in this embodiment of this application, refer to corresponding content in any one of the embodiments corresponding to FIG. 9 to FIG. 12. Details are not described herein again.

The foregoing processor may be a microprocessor, or may be any conventional processor. The steps of the method disclosed with reference to the embodiments of the present invention may be directly performed by a hardware processor, or may be performed by using a combination of hardware in the processor and a software module. When it is implemented by using software, code that implements the foregoing functions may be stored in a computer readable medium, where the computer readable medium includes a computer storage medium. The storage medium may be any available medium that can be accessed by a computer. The following is used as an example but does not constitute a limitation: The computer readable medium may be a random access memory (RAM), a read-only memory (ROM), an electrically erasable programmable read-only memory (EEPROM), a compact disc read-only memory (CD-ROM) or another optical disc storage or disk storage medium or another magnetic storage device, or any other medium that can be used to carry or store program code in a command or data structure form and can be accessed by a computer. The computer readable medium may be a compact disc (CD), a laser disc, an optical disc, a digital video disc (DVD), a floppy disk, or a Blu-ray disc.

A person of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium may be at least one of the following media: a ROM, a RAM, a magnetic disk, an optical disc, or any medium that can store program code.

The embodiments in the specification are all described in a progressive manner, for same or similar parts in the embodiments, refer to these embodiments, and each embodiment focuses on a difference from other embodiments. A system embodiment is basically similar to a method embodiment, and therefore is described briefly. For related parts, refer to some descriptions in the method embodiment.

Obviously, a person skilled in the art can make various modifications and variations to this application without departing from the scope of this application. Therefore, this application is intended to cover these modifications and variations of this application provided that they fall within the scope of the claims of this application and their equivalent technologies.

The invention claimed is:

1. A method, comprising:
receiving, by a detection agent apparatus, location information of a monitoring point on a service path that is sent by a detection control apparatus, wherein the detection agent apparatus is located in a network functions virtualization (NFV) system;
obtaining, by the detection agent apparatus, fault locating information from the monitoring point based on the location information of the monitoring point, wherein the fault locating information is information for locating a fault and is obtained by the monitoring point according to a filter criterion, wherein the fault locating information comprises the location information of the monitoring point; and
sending, by the detection agent apparatus, the fault locating information to the detection control apparatus.

2. The method according to claim 1, wherein before the obtaining, by the detection agent apparatus, fault locating information from the monitoring point based on the location information of the monitoring point, the method further comprises:

receiving, by the detection agent apparatus, a detection packet and location information of an injection point on the service path that are sent by the detection control apparatus, wherein the injection point is a node that is configured to inject the detection packet, wherein the detection packet is a to-be-captured packet based on which the monitoring point obtains the fault locating information; and sending, by the detection agent apparatus, the detection packet to the injection point.

3. The method according to claim 1, wherein before the obtaining, by the detection agent apparatus, fault locating information from the monitoring point based on the location information of the monitoring point, the method further comprises:

receiving, by the detection agent apparatus, characteristic information corresponding to the service path and location information of an injection point on the service path that are sent by the detection control apparatus;

generating, by the detection agent apparatus, M detection packets based on the characteristic information corresponding to the service path, wherein M is an integer greater than or equal to 1, and any one of the M detection packets is a to-be-captured packet based on which the monitoring point obtains the fault locating information; and sending, by the detection agent apparatus, the M detection packets to the injection point.

4. The method according to claim 1, wherein the location information of the monitoring point is any one of the following: the monitoring point is located in a hardware layer, the monitoring point is located in an operating system layer, the monitoring point is located in a virtualization layer of the NFV system, the monitoring point is located between the hardware layer and the operating system layer, or the monitoring point is located between the operating system layer and the virtualization layer.

5. The method according to claim 1, wherein the filter criterion is set at the monitoring point in a static configuration manner, and the filter criterion is used for obtaining the fault locating information from a to-be-filtered packet.

6. A method, comprising:

sending, by a detection control apparatus, location information of a monitoring point on a service path to a detection agent apparatus, wherein the detection agent apparatus is located in network functions virtualization (NFV) system;

receiving, by the detection control apparatus, fault locating information sent by the detection agent apparatus, wherein the fault locating information is information is for locating a fault and is obtained by the monitoring point according to a filter criterion, and the fault locating information comprises the location information of the monitoring point; and determining, by the detection control apparatus, a faulty monitoring point in the NFV system based on the fault locating information and a service model corresponding to the service path.

7. The method according to claim 6, wherein before receiving, by the detection control apparatus, the fault locating information sent by the detection agent apparatus, the method further comprises:

obtaining, by the detection control apparatus, characteristic information corresponding to the service path and location information of an injection point on the service path based on the service model, wherein the characteristic information is information required for generating a detection packet, wherein the injection point is a node that is configured to inject the detection packet;

generating, by the detection control apparatus, the detection packet based on the characteristic information, wherein the detection packet is a to-be-captured packet based on which the monitoring point obtains the fault locating information; and sending, by the detection control apparatus, the detection packet and the location information of the injection point to the detection agent apparatus.

8. The method according to claim 6, wherein before receiving, by the detection control apparatus, the fault locating information sent by the detection agent apparatus, the method further comprises:

obtaining, by the detection control apparatus, characteristic information corresponding to the service path and location information of an injection point on the service path based on the service model, wherein the characteristic information is information required for generating a detection packet by the detection agent apparatus, and the detection packet is a to-be-captured packet based on which the monitoring point obtains the fault locating information; and sending, by the detection control apparatus, the characteristic information and the location information of the injection point to the detection agent apparatus.

9. The method according to claim 6, wherein the location information of the monitoring point is any one of the following: the monitoring point is located in a hardware layer, the monitoring point is located in an operating system layer, the monitoring point is located in a virtualization layer of the NFV system, the monitoring point is located between the hardware layer and the operating system layer, or the monitoring point is located between the operating system layer and the virtualization layer.

10. The method according to claim 6, wherein before sending, by the detection control apparatus, the location information of the monitoring point on the service path to a detection agent apparatus in the NFV system, the method further comprises:

determining, by the detection control apparatus, the first node, the last node, and L intermediate nodes of the service path based on a service, wherein L is an integer greater than or equal to 0;

obtaining, by the detection control apparatus, location information of the first node, location information of the last node, location information of each of the L intermediate nodes, a filter criterion of the first node, a filter criterion of the last node, and a filter criterion of each of the L intermediate nodes based on the service path; and obtaining, by the detection control apparatus, the service model based on the location information of the first node, the location information of the last node, the location information of each of the L intermediate nodes, the filter criterion of the first node, the filter criterion of the last node, and the filter criterion of each of the L intermediate nodes.

11. The method according to claim 6, wherein determining, by the detection control apparatus, the faulty monitoring point in the NFV system based on the fault locating information and the service model corresponding to the service path comprises:

obtaining, by the detection control apparatus, reference values of N parameters based on the service model corresponding to the service path, wherein the N parameters are parameters carried in a packet forwarded along the service path, N is an integer greater than or equal to 1, and the reference values are pre-estimated values of the N parameters obtained when there is no fault source on the service path;

obtaining, by the detection control apparatus, measured values of the N parameters from the fault locating information, wherein the measured values are actual values of the N parameters obtained from the packet forwarded along the service path; and comparing, by the detection control apparatus, the reference values of the N parameters with the measured values of the N parameters, to determine the faulty monitoring point, wherein the faulty monitoring point is a monitoring point corresponding to a parameter whose measured value is different from its reference value.

12. A detection agent apparatus, comprising:
a transceiver configured to:
receive location information of a monitoring point on a service path that is sent by a detection control apparatus; and
send fault locating information to the detection control apparatus;
a memory comprising instructions; and
one or more processors coupled with the memory, wherein the one or more processors execute the instructions to:
obtain the fault locating information from the monitoring point based on the location information of the monitoring point, wherein the fault locating information is information for locating a fault and is obtained by the monitoring point according to a filter criterion, wherein the fault locating information comprises the location information of the monitoring point.

13. The detection agent apparatus according to claim 12, comprising:
the transceiver configured to:
receive a detection packet and location information of an injection point on the service path that are sent by the detection control apparatus, wherein the injection point is a node that is configured to inject the detection packet, wherein the detection packet is a to-be-captured packet based on which the monitoring point obtains the fault locating information; and
send the detection packet to the injection point.

14. The detection agent apparatus according to claim 12, comprising:
the transceiver configured to:
receive characteristic information corresponding to the service path and location information of an injection point on the service path that are sent by the detection control apparatus; and
send M detection packets to the injection point; and
the one or more processors execute the instructions to:
generate the M detection packets based on the characteristic information corresponding to the service path, wherein M is an integer greater than or equal to 1, and any one of the M detection packets is a to-be-captured packet based on which the monitoring point obtains the fault locating information.

15. The detection agent apparatus according to claim 12, wherein the fault locating information is information that is obtained after the monitoring point filters a service packet forwarded along the service path.

16. The detection agent apparatus according to claim 12, wherein the detection agent apparatus is located in the hardware layer, the operating system layer, or the virtualization layer of the NFV system.

17. The detection agent apparatus according to claim 12, comprising:
the transceiver configured to:
receive the filter criterion of the monitoring point that is sent by the detection control apparatus, wherein the filter criterion is used for obtaining the fault locating information from a to-be-filtered packet; and
send the filter criterion of the monitoring point to the monitoring point based on the location information of the monitoring point.

18. The detection agent apparatus according to claim 12, comprising:
at least one of the one or more processors execute the instructions to periodically read the fault locating information from the monitoring point; or the transceiver configured to receive the fault locating information periodically sent by the monitoring point.

19. A detection control apparatus, comprising:
a transceiver configured to:
send location information of a monitoring point on a service path to a detection agent apparatus, wherein the detection agent apparatus is located in a network functions virtualization (NFV) system; and
receive fault locating information sent by the detection agent apparatus, wherein the fault locating information is information for locating a fault and is obtained by the monitoring point according to a filter criterion, wherein the fault locating information comprises the location information of the monitoring point;
a memory comprising instructions; and
one or more processors coupled with the memory, wherein the one or more processors execute the instructions to:
determine a faulty monitoring point in the NFV system based on the fault locating information and a service model corresponding to the service path.

20. The detection control apparatus according to claim 19, comprising:
the one or more processors execute the instructions to:
obtain characteristic information corresponding to the service path and location information of an injection point on the service path based on the service model, wherein the characteristic information is information required for generating a detection packet, wherein the injection point is a node that is configured to inject the detection packet;
generate the detection packet based on the characteristic information, wherein the detection packet is a to-be-captured packet based on which the monitoring point obtains the fault locating information; and
the transceiver configured to:
send the detection packet and the location information of the injection point to the detection agent apparatus.

21. The detection control apparatus according to claim 19, comprising:
the one or more processors execute the instructions to:
obtain characteristic information corresponding to the service path and location information of an injection point on the service path based on the service model, wherein the characteristic information is information required for generating a detection packet by the detection agent apparatus, and the detection packet is a to-be-captured packet based on which the monitoring point obtains the fault locating information; and the transceiver configured to:
send the characteristic information and the location information of the injection point to the detection agent apparatus.

22. The detection control apparatus according to claim 19, comprising:
the one or more processors execute the instructions to:
obtain the filter criterion of the monitoring point based on the service model, wherein the filter criterion is used for obtaining the fault locating information from a to-be-filtered packet; and
the transceiver configured to:
send the filter criterion of the monitoring point to the detection agent apparatus.

23. The detection control apparatus according to claim 19, comprising:
the one or more processors execute the instructions to:
determine the first node, the last node, and L intermediate nodes of the service path based on a service, wherein L is an integer greater than or equal to 0;
obtain location information of the first node, location information of the last node, location information of each of the L intermediate nodes, a filter criterion of the first node, a filter criterion of the last node, and a filter criterion of each of the L intermediate nodes based on the service path; and
obtain the service model based on the location information of the first node, the location information of the last node, the location information of each of the L intermediate nodes, the filter criterion of the first node, the filter criterion of the last node, and the filter criterion of each of the L intermediate nodes.

24. The detection control apparatus according to of claim 19, comprising:
the one or more processors execute the instructions to:
obtain reference values of N parameters based on the service model corresponding to the service path, wherein the N parameters are parameters carried in a packet forwarded along the service path, N is an integer greater than or equal to 1, and the reference values are pre-estimated values of the N parameters obtained when there is no fault source on the service path;

obtain measured values of the N parameters from the fault locating information, wherein the measured values are actual values of the N parameters obtained from the packet forwarded along the service path; and
compare the reference values of the N parameters with the measured values of the N parameters, to determine the faulty monitoring point, wherein the faulty monitoring point is a monitoring point corresponding to a parameter whose measured value is different from its reference value.

25. The detection control apparatus according to of claim 19, comprising:
the one or more processors execute the instructions to:
trigger, by using a Network Configuration Protocol (NETCONF) interface, the detection agent apparatus to obtain the fault locating information.

26. A fault detection system, wherein the system comprises
a detection agent apparatus configured to:
receive location information of a monitoring point on a service path that is sent by a detection control apparatus;
send fault locating information to the detection control apparatus; and
obtain the fault locating information from the monitoring point based on the location information of the monitoring point, wherein the fault locating information is information for locating a fault and is obtained by the monitoring point according to a filter criterion, wherein the fault locating information comprises the location information of the monitoring point; and
a detection control apparatus configured to:
send the location information of the monitoring point on the service path to the detection agent apparatus, wherein the detection agent apparatus is located in a network functions virtualization (NFV) system;
receive the fault locating information sent by the detection agent apparatus, wherein the fault locating information is information obtained by the monitoring point according to the filter criterion, and the fault locating information comprises the location information of the monitoring point; and
determine a faulty monitoring point in the NFV system based on the fault locating information and a service model corresponding to the service path.

* * * * *